United States Patent
Endo et al.

(10) Patent No.: US 8,141,207 B2
(45) Date of Patent: Mar. 27, 2012

(54) TWO-AXIS HINGE DEVICE AND MOBILE TERMINAL APPARATUS

(75) Inventors: Isao Endo, Kanagawa (JP); Tsutomu Takahashi, Kanagawa (JP)

(73) Assignee: Sony Ericsson Mobile Communicatoins Japan, Inc., Tokyo (JP)

( * ) Notice: Subject to any disclaimer, the term of this patent is extended or adjusted under 35 U.S.C. 154(b) by 400 days.

(21) Appl. No.: 12/407,137

(22) Filed: Mar. 19, 2009

(65) Prior Publication Data

US 2009/0265890 A1 Oct. 29, 2009

(30) Foreign Application Priority Data

Apr. 24, 2008 (JP) ................................. 2008-113329

(51) Int. Cl.
*E05D 3/10* (2006.01)

(52) U.S. Cl. ......... 16/367; 16/376; 16/371; 361/679.07; 379/433.13

(58) Field of Classification Search ................. 16/367, 16/374, 376, 377, 337, 340, 338, 371, 363, 16/348, 357; 379/433.13; 455/575.1, 575.3; 361/679.06, 679.07
See application file for complete search history.

(56) References Cited

U.S. PATENT DOCUMENTS

| | | | | |
|---|---|---|---|---|
| 5,289,616 | A * | 3/1994 | Taniyama | 16/376 |
| 7,440,783 | B2 * | 10/2008 | Hyun | 455/575.3 |
| 7,533,450 | B2 * | 5/2009 | Chien | 16/367 |
| 7,792,555 | B2 * | 9/2010 | Kawasaki et al. | 455/575.3 |
| 7,797,797 | B2 * | 9/2010 | Chiang et al. | 16/367 |
| 7,925,312 | B2 * | 4/2011 | Takagi et al. | 455/575.1 |
| 7,949,312 | B2 * | 5/2011 | Takagi | 455/575.3 |
| 2004/0224729 | A1 * | 11/2004 | Watanabe et al. | 455/575.3 |
| 2004/0231105 | A1 * | 11/2004 | Ahn | 16/367 |
| 2005/0005401 | A1 * | 1/2005 | Bae | 16/374 |
| 2005/0245294 | A1 | 11/2005 | Gupte et al. | |
| 2006/0021195 | A1 * | 2/2006 | Yamada et al. | 16/367 |
| 2006/0034450 | A1 | 2/2006 | Chang | |
| 2006/0162122 | A1 * | 7/2006 | Satoh et al. | 16/221 |
| 2006/0193469 | A1 * | 8/2006 | Kfoury | 379/433.13 |
| 2007/0107163 | A1 * | 5/2007 | Barnett | 16/367 |
| 2008/0040887 | A1 * | 2/2008 | Dickerson | 16/337 |
| 2008/0078062 | A1 * | 4/2008 | Hsu et al. | 16/367 |

FOREIGN PATENT DOCUMENTS

| | | |
|---|---|---|
| EP | 1 467 539 A2 | 10/2004 |
| GB | 2064642 A * | 6/1981 |
| JP | 2007-281239 | 10/2007 |

* cited by examiner

*Primary Examiner* — Victor Batson
*Assistant Examiner* — Jeffrey O Brien
(74) *Attorney, Agent, or Firm* — Oblon, Spivak, McClelland, Maier & Neustadt, L.L.P.

(57) ABSTRACT

A two-axis hinge device includes a first-rotation-axis defining unit which defines a first rotation axis; a rotating arm fixed to a first housing, the rotating arm being provided on the first-rotation-axis defining unit such that the rotating arm is rotatable around the first rotation axis; a second-rotation-axis defining unit fixed to a second housing, the second-rotation-axis defining unit having a substantially cylindrical shape and defining a second rotation axis which is substantially perpendicular to the first rotation axis, the first-rotation-axis defining unit being fixed to and supported by the second-rotation-axis defining unit; and a hole-communicating connector fixed to the second-rotation-axis defining unit, the hole-communicating connector having a substantially cylindrical shape and being provided with a hole which communicates with a hole in the second-rotation-axis defining unit.

3 Claims, 24 Drawing Sheets

TWO-AXIS HINGE DEVICE AND MOBILE TERMINAL APPARATUS

BACKGROUND OF THE INVENTION

1. Field of the Invention

The present invention relates to a two-axis hinge device suitable for use in a mobile phone, a personal handyphone system (PHS), a personal digital assistant (PDA), a portable game device, a notebook personal computer, etc., which includes a first housing and a second housing that are connected to each other with a hinge unit, and to a mobile terminal apparatus.

More particularly, the present invention relates to a two-axis hinge device which includes a first-rotation-axis defining unit and a second-rotation-axis defining unit that are perpendicular to each other. The second-rotation-axis defining unit has a substantially cylindrical shape, and includes a substantially cylindrical hole-communicating connector. The overall size of the two-axis hinge device can be reduced since an electrical connecting member, such as a harness or a flexible board, for connecting electrical components disposed in a first housing and a second housing to each other can be disposed so as to extend through the hole in the second-rotation-axis defining unit and the hole in the hole-communicating connector. The present invention also relates to a mobile terminal apparatus including the two-axis hinge device.

2. Description of the Related Art

Japanese Unexamined Patent Application Publication No. 2007-281239 (see pages 5 and 6 and FIG. 1) discloses a compact foldable mobile terminal in which the resistance to twisting and bending of a flexible printed circuit (FPC) board is increased. This foldable mobile terminal includes a two-axis hinge mechanism in which a first hinge shaft and a second hinge shaft are connected to each other with a connecting member such that the first and second hinge shafts are perpendicular to each other.

The two-axis hinge mechanism includes an FPC holding structure for holding an FPC including a short section and a long section. The short section is disposed parallel to the second hinge shaft, and the long section is inclined with respect to the short section and is wound around the second hinge shaft. The short section of the FPC is held on the connecting member by a holding member formed of an elastic body that is partially cut in an area near a base end of the wound portion of the long section of the FPC.

In the two-axis hinge mechanism of the above-described foldable mobile terminal, the FPC is held by the holding member formed of the elastic body that is partially cut in an area near the base end of the wound portion. Therefore, the distance between a base end of the FPC at which the FPC is held and the base end of the wound portion of the FPC can be increased without increasing the length of the short section of the FPC. Accordingly, the load applied at the base end of the FPC when the FPC is twisted can be reduced and the resistance to twisting of the FPC can be increased.

In addition, since the holding member is formed of the elastic body, when a load is applied to the FPC, the holding member contracts and thereby suppresses the FPC from being suddenly deformed. In other words, the bending radius at which the FPC is twisted is increased. Thus, the resistance can be increased. In addition, since the short section of the FPC is twisted, the load applied to the long section of the FPC due to the winding of the long section can be reduced. Thus, the load applied to the long section due to the winding thereof can be reduced without increasing the winding radius.

SUMMARY OF THE INVENTION

However, in the two-axis hinge mechanism of the foldable mobile terminal disclosed in Japanese Unexamined Patent Application Publication No. 2007-281239, a structure (the above-described FPC holding structure) for holding the FPC such that the FPC is wound around the second shaft is necessary. Therefore, the size of the two-axis hinge device is increased by an amount corresponding to the size of the FPC holding structure, and it is difficult to reduce the size of the apparatus in which the two-axis hinge device is installed.

If the size of the hinge device is large, the hinge device largely protrudes from a housing. Therefore, there is a risk that electric wave disturbances will occur due to the hinge device.

In light of the above-described problems, it is desirable to provide a two-axis hinge device in which a space for installing a harness or a flexible board for connecting electrical components disposed in first and second housings to each other can be omitted, so that the size of the two-axis hinge device can be reduced by an amount corresponding to the size of the space and the occurrence of electric wave disturbances or the like which occur if the size of the two-axis hinge device is large can be prevented. It is also desirable to provide a mobile terminal apparatus including the two-axis hinge device.

A two-axis hinge device according to an embodiment of the present invention includes a first-rotation-axis defining unit which defines a first rotation axis; a rotating arm fixed to a first housing, the rotating arm being provided on the first-rotation-axis defining unit such that the rotating arm is rotatable around the first rotation axis; a second-rotation-axis defining unit fixed to a second housing, the second-rotation-axis defining unit having a substantially cylindrical shape and defining a second rotation axis which is substantially perpendicular to the first rotation axis, the first-rotation-axis defining unit being fixed to and supported by the second-rotation-axis defining unit; and a hole-communicating connector fixed to the second-rotation-axis defining unit, the hole-communicating connector having a substantially cylindrical shape and being provided with a hole which communicates with a hole in the second-rotation-axis defining unit.

The two-axis hinge device includes the first-rotation-axis defining unit and the second-rotation-axis defining unit that are perpendicular to each other. At least the second-rotation-axis defining unit has a substantially cylindrical shape, and the substantially cylindrical hole-communicating connector having the hole which communicates with the hole in the second-rotation-axis defining unit is provided on the second-rotation-axis defining unit.

Thus, the overall size of the two-axis hinge device can be reduced since an electrical connecting member, such as a harness or a flexible board, for connecting electrical components disposed in the first housing and the second housing to each other can be disposed so as to extend through the hole in the second-rotation-axis defining unit and the hole in the hole-communicating connector. In addition, since the overall size can be reduced, the occurrence of electric wave disturbances or the like which occur if the size of the two-axis hinge device is large can be prevented.

According to the present invention, the size of the two-axis hinge device can be reduced. In addition, since the size of the two-axis hinge device can be reduced, the occurrence of electric wave disturbances or the like which occur if the size of the two-axis hinge unit is large can be prevented.

DESCRIPTION OF THE PREFERRED EMBODIMENTS

The present invention can be applied to a foldable mobile terminal apparatus.

Structure of Mobile Phone

Figure 1:
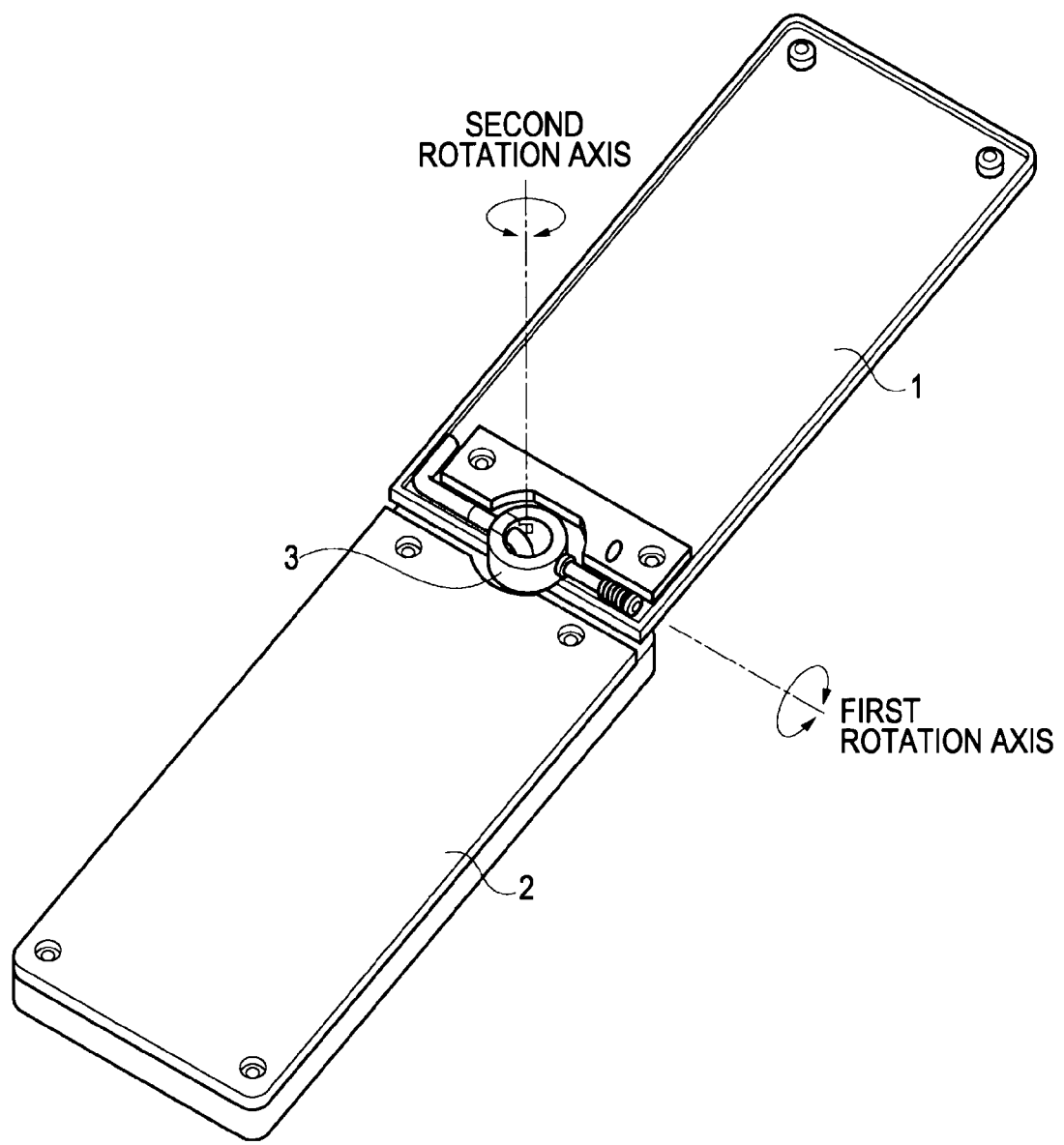
FIG. 1 is a perspective view of a mobile phone according to an embodiment of the present invention in a vertically opened state.

FIG. 1 is a perspective view of a mobile phone according to an embodiment of the present invention in a vertically opened state. As shown in FIG. 1, the mobile phone according to the present embodiment includes an upper housing 1, a lower housing 2, and a two-axis hinge unit 3. The upper housing 1 is provided with a display unit, such as a liquid crystal display and an organic electroluminescence (EL) display. The lower housing 2 is provided with an operating unit including a rotation operation key, numeric keys, and the like. The two-axis hinge unit 3 allows the housings 1 and 2 to rotate relative to each other around a first rotation axis which extends along short sides of the housings 1 and 2 and also around a second rotation axis which is substantially perpendicular to the first rotation axis and extends along the thickness direction of the housings 1 and 2.

Structure of Two-Axis Hinge Unit

Figure 2:
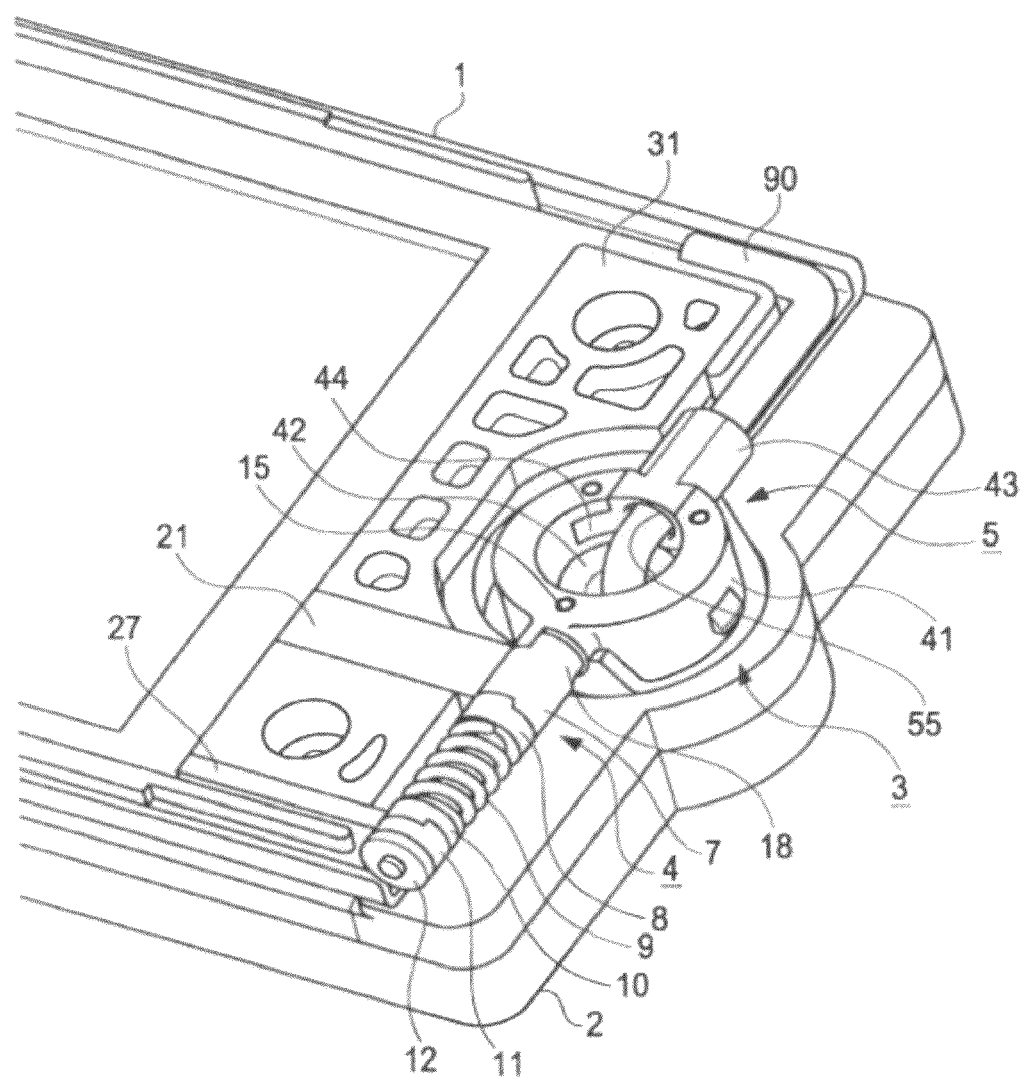
FIG. 2 is a perspective view of a two-axis hinge unit included in the mobile phone.

As shown in FIG. 2, the two-axis hinge unit 3 includes a first-rotation-axis defining unit 4 which allows the upper housing 1 and the lower housing 2 to rotate relative to each other around the first rotation axis, and a second-rotation-axis defining unit 5 which allows the upper housing 1 and the lower housing 2 to rotate relative to each other around the second rotation axis.

Structure of First-Rotation-Axis Defining Unit

Figure 3:
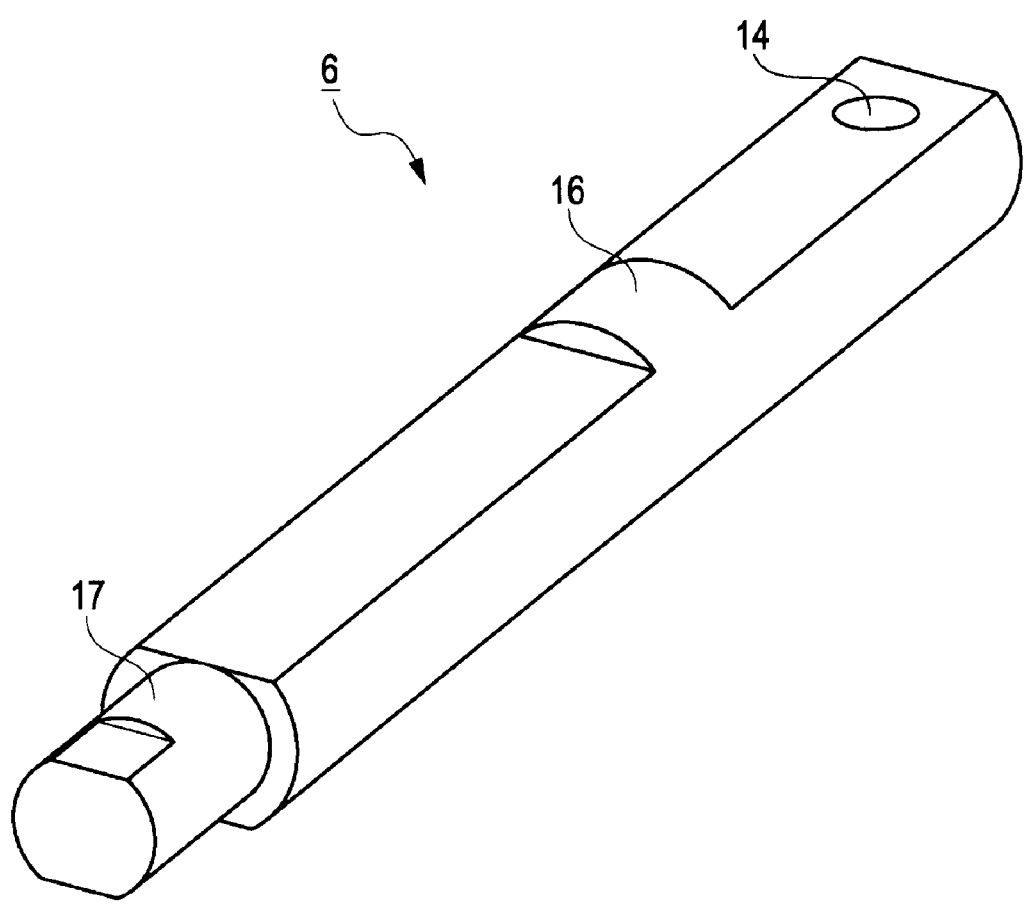
FIG. 3 is a perspective view of a first shaft member included in the two-axis hinge unit.

Referring to FIG. 2, the first-rotation-axis defining unit 4 is formed by successively fitting a first rotating arm 7, a cam member 8, a spring 9, a second rotating arm 10, a cam member 11, and a washer stopper 12 to a substantially columnar first shaft member 6 shown in FIG. 3.

Figure 4:
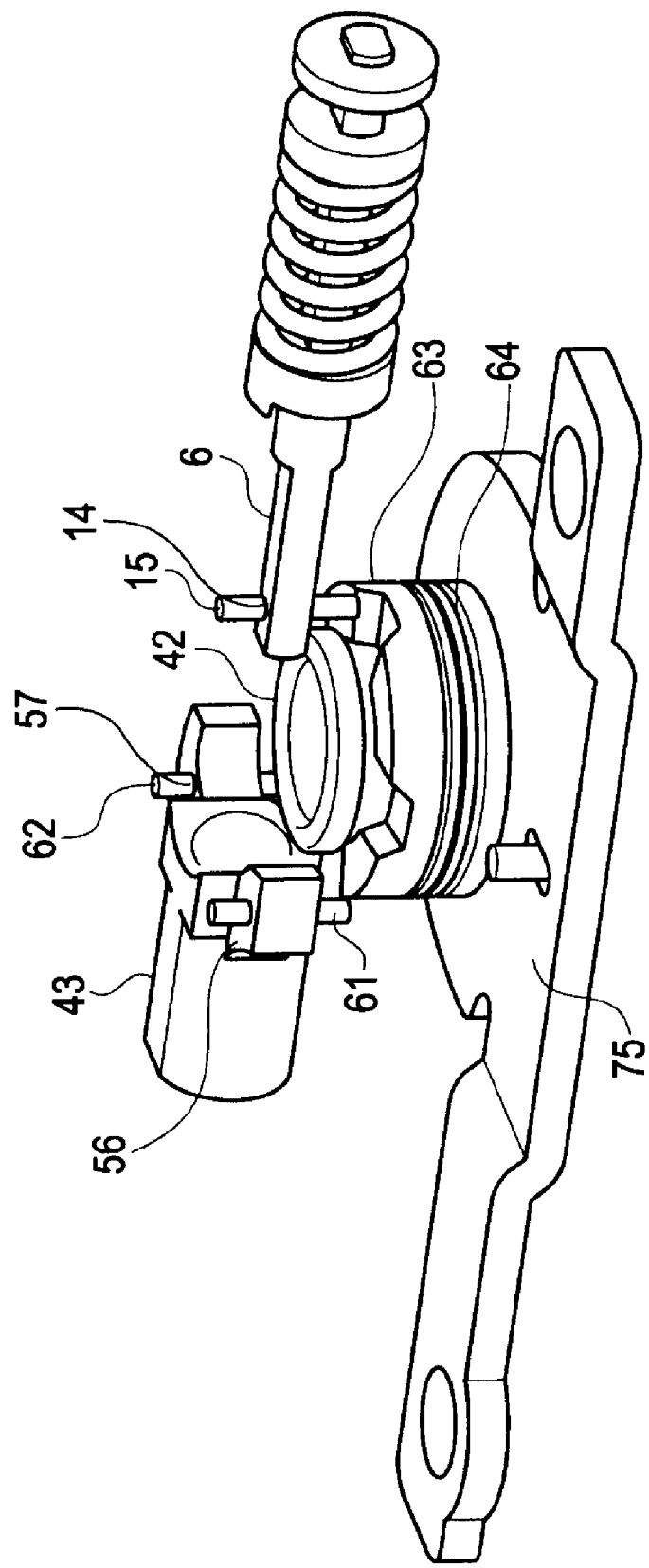
FIG. 4 is a perspective view of the main part of the two-axis hinge unit.

The substantially columnar first shaft member 6 shown in FIG. 3 has a pin-stopping hole 14 at one end thereof. As shown in FIGS. 2 and 4, a pin 15 is inserted into the pin-stopping hole 14 so as to fix the first shaft member 6 to the second-rotation-axis defining unit 5, which will be described below.

As shown in FIG. 3, the circumferential outer surface of the first shaft member 6 is cut such that flat surfaces are formed in areas other than a first-rotating-arm receiving portion 16 on which the first rotating arm 7 is disposed and a second-rotating-arm receiving portion 17 on which the second rotating arm 10 is disposed.

Figure 5:
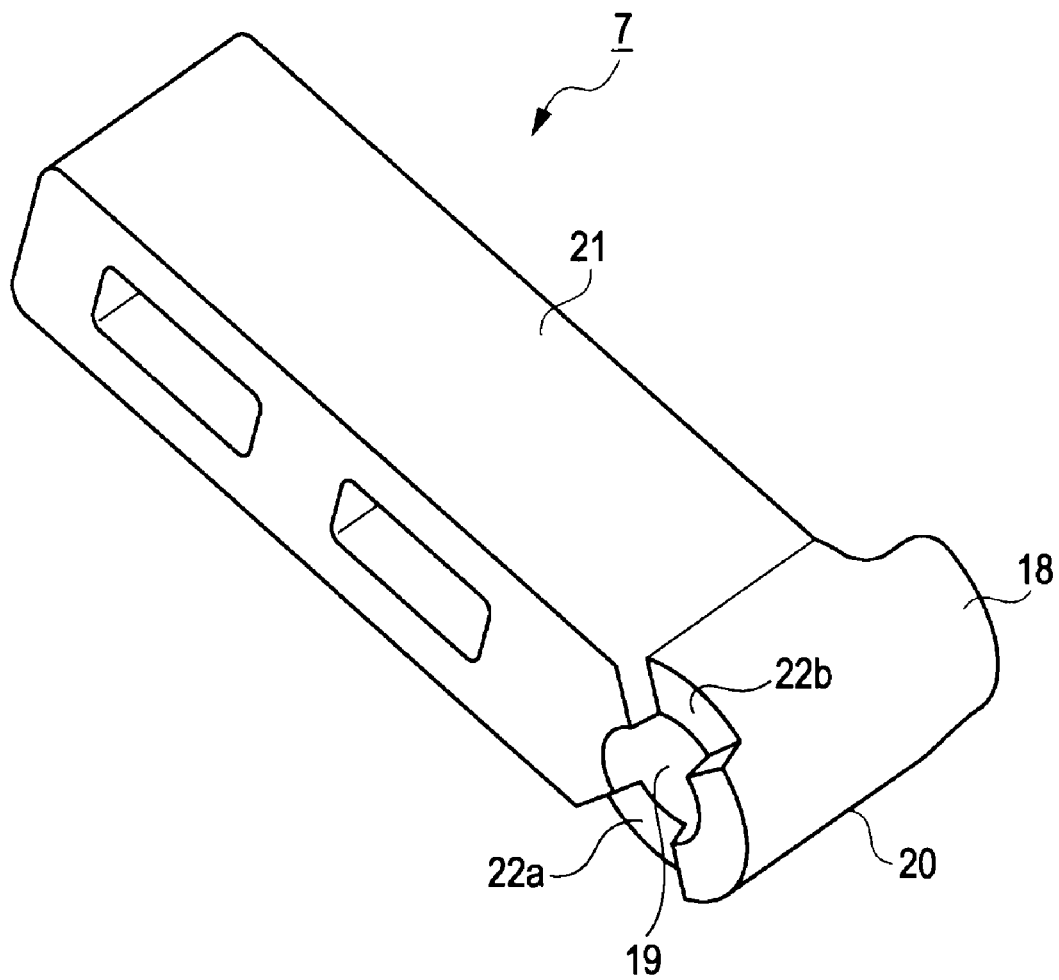
FIG. 5 is a perspective view of a first rotating arm included in the first shaft member of the two-axis hinge unit.

As shown in FIG. 5, the first rotating arm 7 includes a substantially cylindrical rotation-supporting portion 20 having a hole 19 through which the first shaft member 6 is inserted and a rectangular plate-shaped arm portion 21 provided so as to project from the outer periphery of the rotation-supporting portion 20. The first shaft member 6 is inserted through the hole 19 in the first rotating arm 7 such that the first rotating arm 7 is disposed on the first-rotating-arm receiving portion 16 of the first shaft member 6. As described above, the first-rotating-arm receiving portion 16 of the first shaft member 6 has a circumferential outer surface. Therefore, the first rotating arm 7 is rotatable in the circumferential direction of the first shaft member 6.

Referring to FIG. 5, the first rotating arm 7 includes a projection 18 at a first end thereof and a pair of recesses 22a and 22b at a second end thereof. The projection 18 at the first end of the first rotating arm 7 engages with a cam portion included in the second-rotation-axis defining unit 5, which will be described below. When the mobile phone is vertically opened and an opening angle between the upper housing 1 and the lower housing 2 reaches about 165 degrees, the projection 18 comes into contact with a stopper (denoted by 50 shown in FIG. 10) provided in the second-rotation-axis defining unit 5. Thus, the opening angle is restricted to about 165 degrees.

Figure 6:
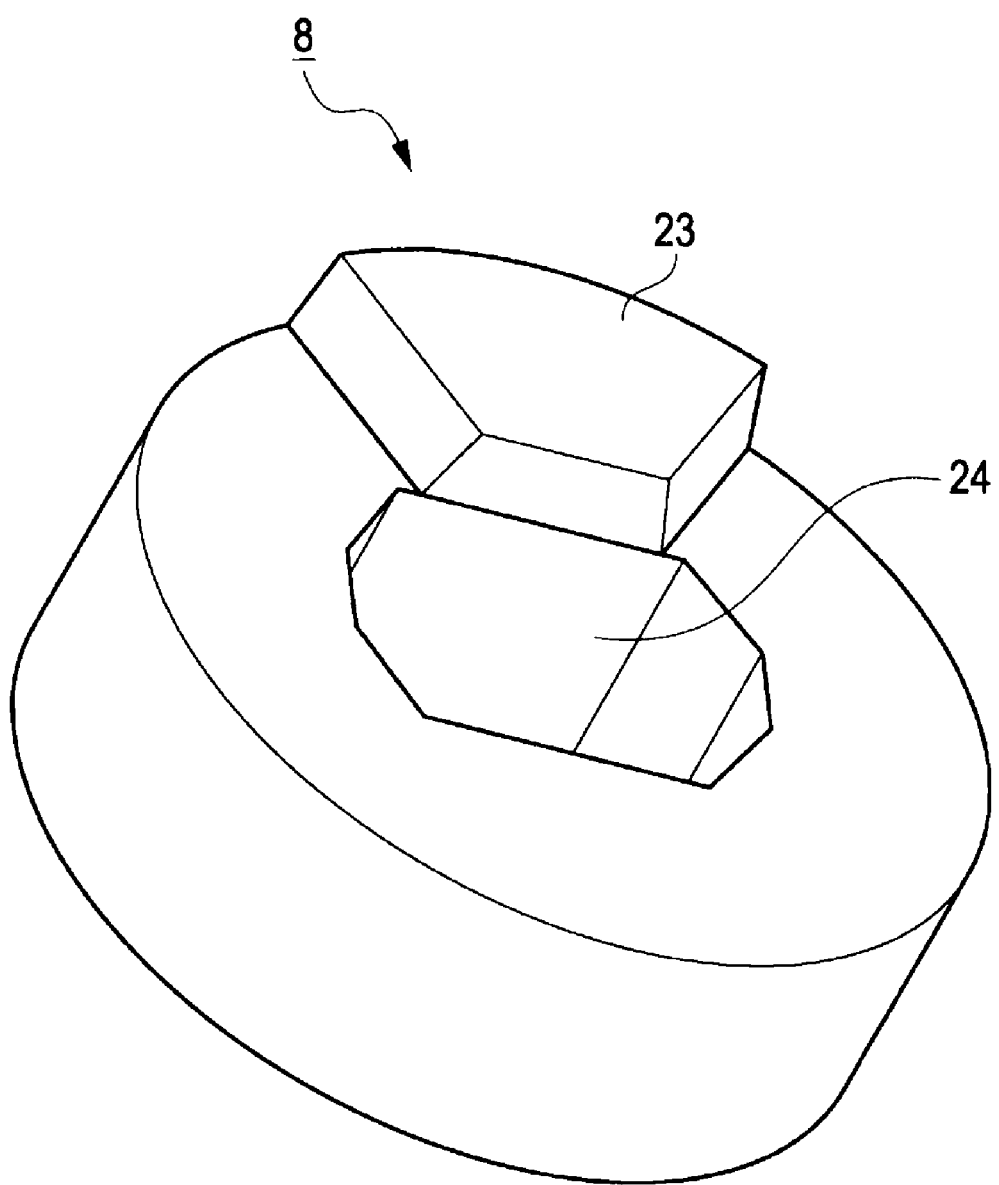
FIG. 6 is a perspective view of a cam member fitted to the first rotating arm.

The recesses 22a and 22b at the second end of the first rotating arm 7 are engageable with a projection 23 provided on the cam member 8 shown in FIG. 6. The cam member 8 has a ring-like cylindrical shape, and a hole 24 is formed in the cam member 8. The hole 24 has a shape corresponding to the shape of a portion of the first shaft member 6 at which the circumferential outer surface is cut such that flat surfaces are formed. The cam member 8 is fixed to the first shaft member 6 by inserting the first shaft member 6 through the hole 24. Of the recesses 22a and 22b provided at the second end of the first rotating arm 7, the recess 22a engages with the projection 23 on the cam member 8 when the mobile phone is closed and the recess 22b engages with the projection 23 on the cam member 8 when the mobile phone is opened by about 165 degrees.

As shown in FIG. 2, the cam member 8 is urged against the first rotating arm 7 by the spring 9. Therefore, when the mobile phone is closed, the projection 23 on the cam member 8, which is urged by the spring 9, becomes engaged with the recess 22a in the first rotating arm 7. In addition, when the mobile phone is vertically opened by about 165 degrees, the projection 23 on the cam member 8, which is urged by the spring 9, becomes engaged with the recess 22b in the first rotating arm 7. In either case, a click feeling is generated.

Figure 7:
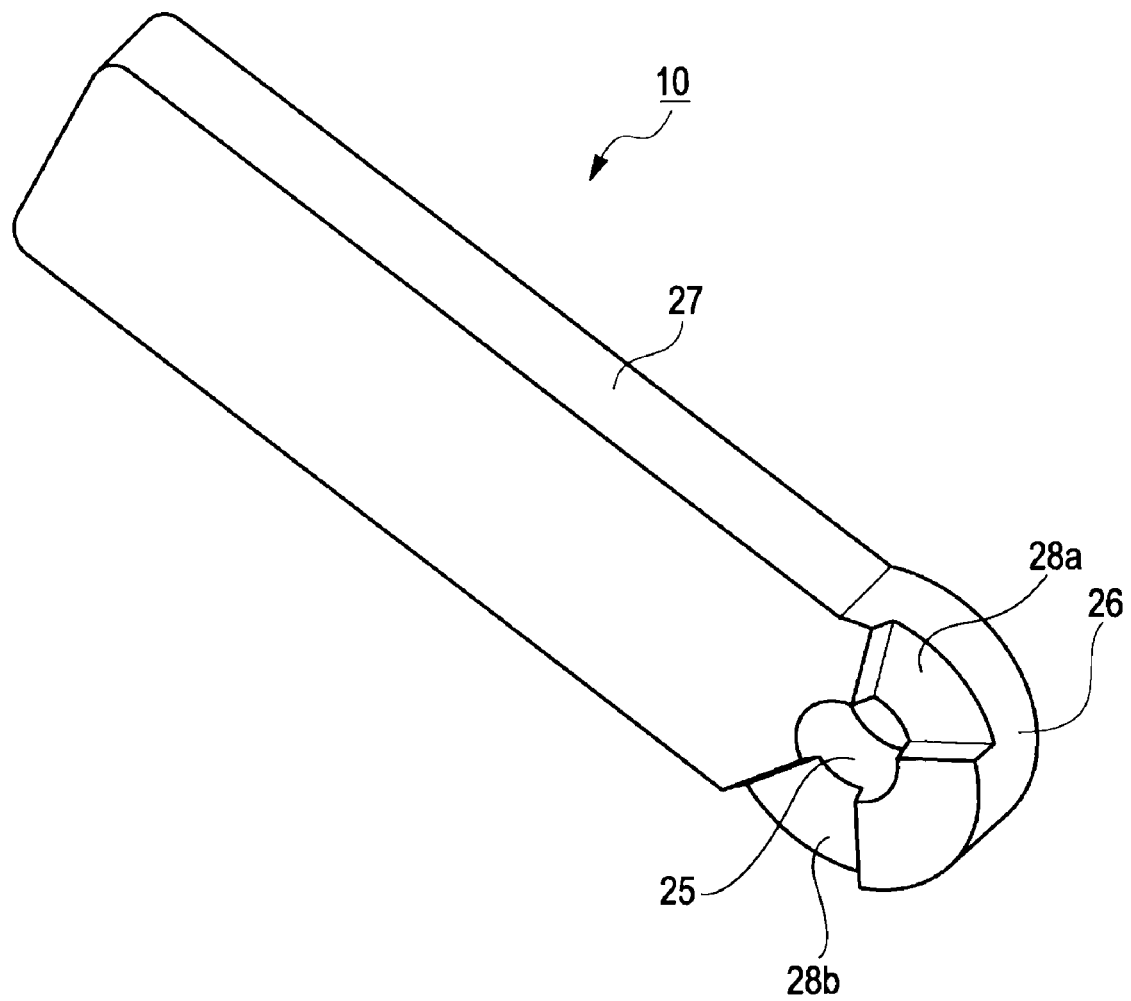
FIG. 7 is a perspective view of a second rotating arm included in the first shaft member of the two-axis hinge unit.

As shown in FIG. 7, the second rotating arm 10 includes a substantially cylindrical rotation-supporting portion 26 having a hole 25 through which the first shaft member 6 is inserted and a rectangular plate-shaped arm portion 27 provided so as to project from the outer periphery of the rotation-supporting portion 26. The first shaft member 6 is inserted through the hole 25 in the second rotating arm 10 such that the second rotating arm 10 is disposed on the second-rotating-arm receiving portion 17 (see FIG. 3) of the first shaft member 6. As described above, the second-rotating-arm receiving portion 17 of the first shaft member 6 has a circumferential outer surface. Therefore, the second rotating arm 10 is rotatable in the circumferential direction of the first shaft member 6.

The second rotating arm 10 has a pair of recesses 28a and 28b at an end opposite to the end at which the second rotating arm 10 is in contact with the spring 9. The recesses 28a and 28b are engageable with a projection 29 provided on the cam member 11 shown in FIG. 8. The cam member 11 has a ring-like cylindrical shape, and a hole 30 is formed in the cam member 11. The hole 30 has a shape corresponding to the shape of a portion of the first shaft member 6 at which the circumferential outer surface is cut such that flat surfaces are formed. The cam member 11 is fixed to the first shaft member 6 by inserting the first shaft member 6 through the hole 30. Of the recesses 28a and 28b provided at the end of the second rotating arm 10 opposite to the end at which the spring 9 is provided, the recess 28a engages with the projection 29 on the cam member 11 when the mobile phone is closed and the recess 28b engages with the projection 29 on the cam member 11 when the mobile phone is vertically opened by about 165 degrees.

The cam member 11 is in contact with the second rotating arm 10 that is urged by the spring 9, as shown in FIG. 2. Therefore, when the mobile phone is closed, the projection 29 on the cam member 11 becomes engaged with the recess 28a in the second rotating arm 10 which is urged by the spring 9. In addition, when the mobile phone is vertically opened by about 165 degrees, the projection 29 on the cam member 11 becomes engaged with the recess 28b in the second rotating arm 10 which is urged by the spring 9. In either case, a click feeling is generated.

As shown in FIG. 2, the washer stopper 12 is fixed to the first shaft member 6 at an end opposite to the end at which the first shaft member 6 is connected to the second-rotation-axis defining unit 5. Therefore, the urging force of the spring 9 is applied in the direction toward the second-rotation-axis defining unit 5 and in the direction toward the washer stopper 12. Thus, the spring 9 urges the cam member 8 against the first rotating arm 7 and the second rotating arm 10 against the cam member 11.

Figure 9:
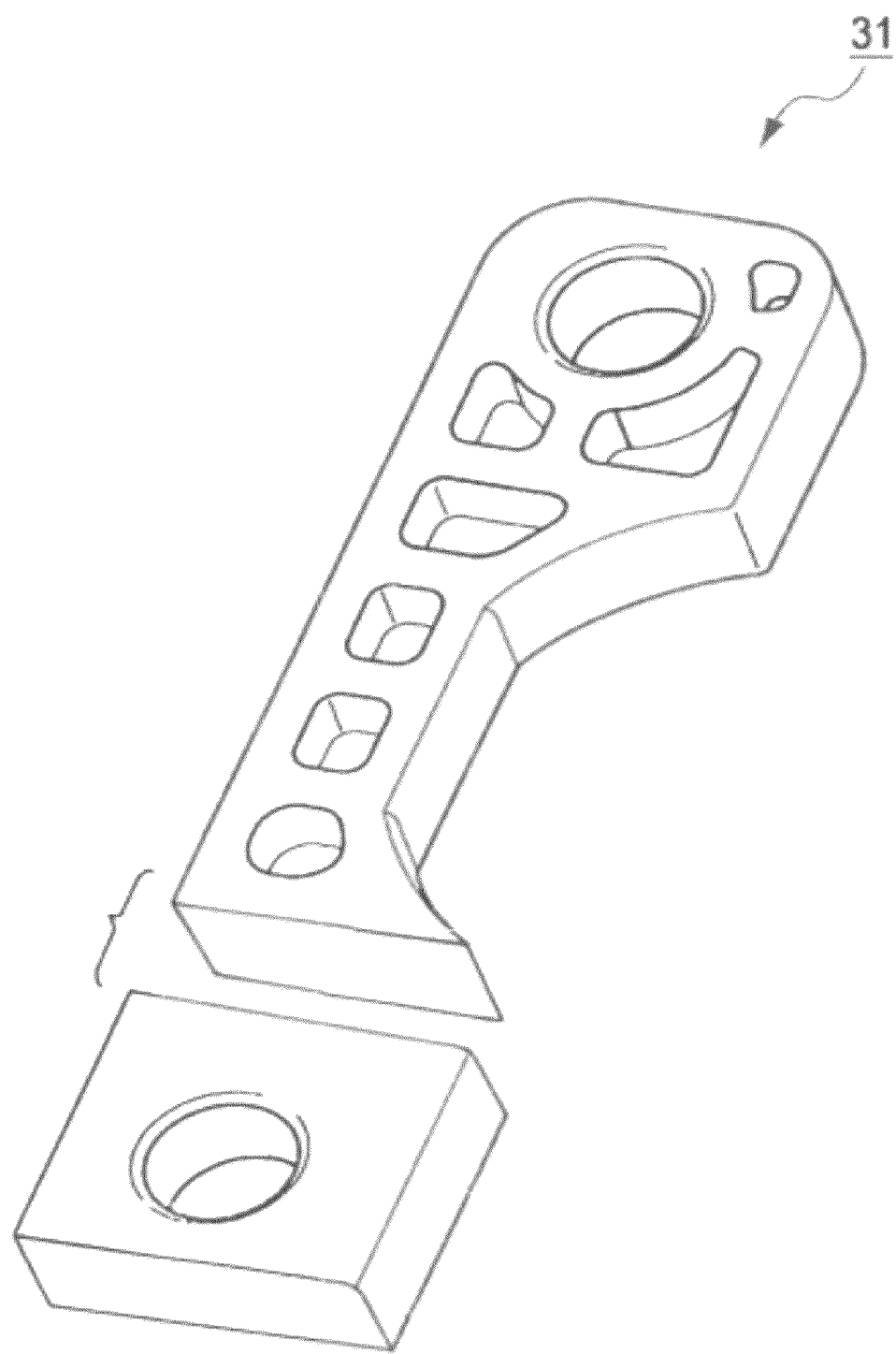
FIG. 9 is a perspective view of a fixing plate for fixing the first and second rotating arms of the two-axis hinge unit to an upper housing.

The arm portion 21 of the first rotating arm 7 and the arm portion 27 of the second rotating arm 10 are fixed to the upper housing 1 by a rectangular plate-shaped fixing plate 31 shown in FIGS. 2 and 9 such that the arm portions 21 and 27 are disposed between an upper half and a lower half of the upper housing 1. Therefore, when the mobile phone is vertically opened as shown in FIG. 1, the first rotating arm 7 and the second rotating arm 10, which are fixed to the upper housing 1, rotate around the first rotation axis defined by the first-rotation-axis defining unit 4 (along the circumferential direction of the first shaft member 6) in response to the operation of opening the mobile phone.

Structure of Second-Rotation-Axis Defining Unit

Referring to FIG. 2, the second-rotation-axis defining unit 5 includes a rotating-shaft connector 41 which connects the second-rotation-axis defining unit 5 to the above-described first-rotation-axis defining unit 4, a substantially cylindrical second shaft member 42 which is inserted in the rotating-shaft connector 41 and defines the second rotation axis, and a hole-communicating connector 43 fixed to the rotating-shaft connector 41. The rotating-shaft connector 41 has a communicating hole 55 which communicates with a hole 44 formed in the second shaft member 42 inserted in the rotating-shaft connector 41.

The rotating-shaft connector 41 includes a first cylindrical member 45 and a second cylindrical member 46 that are stacked together. The second cylindrical member 46 has a larger diameter than the diameter of the first cylindrical member 45. The first cylindrical member 45 and the second cylindrical member 46 respectively have holes 47 and 48 which are formed coaxially with each other. The diameter of the hole 47 in the first cylindrical member 45 is larger than the diameter of the hole 48 in the second cylindrical member 46.

The first cylindrical member 45 has a first-shaft-member insertion hole 49 and the stopper 50 at the outer periphery thereof. The first shaft member 6 in the first-rotation-axis defining unit 4 is inserted into the first-shaft-member insertion hole 49. The stopper 50 restricts the opening angle of the mobile phone to about 165 degrees by coming into contact with the projection 18 on the first rotating arm 7 on the first shaft member 6 when the mobile phone is vertically opened and the opening angle reaches about 165 degrees.

The first cylindrical member 45 has a pin insertion hole 51 which communicates with the first-shaft-member insertion hole 49 in the top surface thereof. When the pin 15 is into the pin insertion hole 51 while the first shaft member 6 is inserted in the first-shaft-member insertion hole 49, the pin 15 is inserted through the pin-stopping hole 14 formed in the first shaft member 6, as shown in FIG. 4. Thus, the first shaft member 6 is fixed to the rotating-shaft connector 41.

Figure 11:
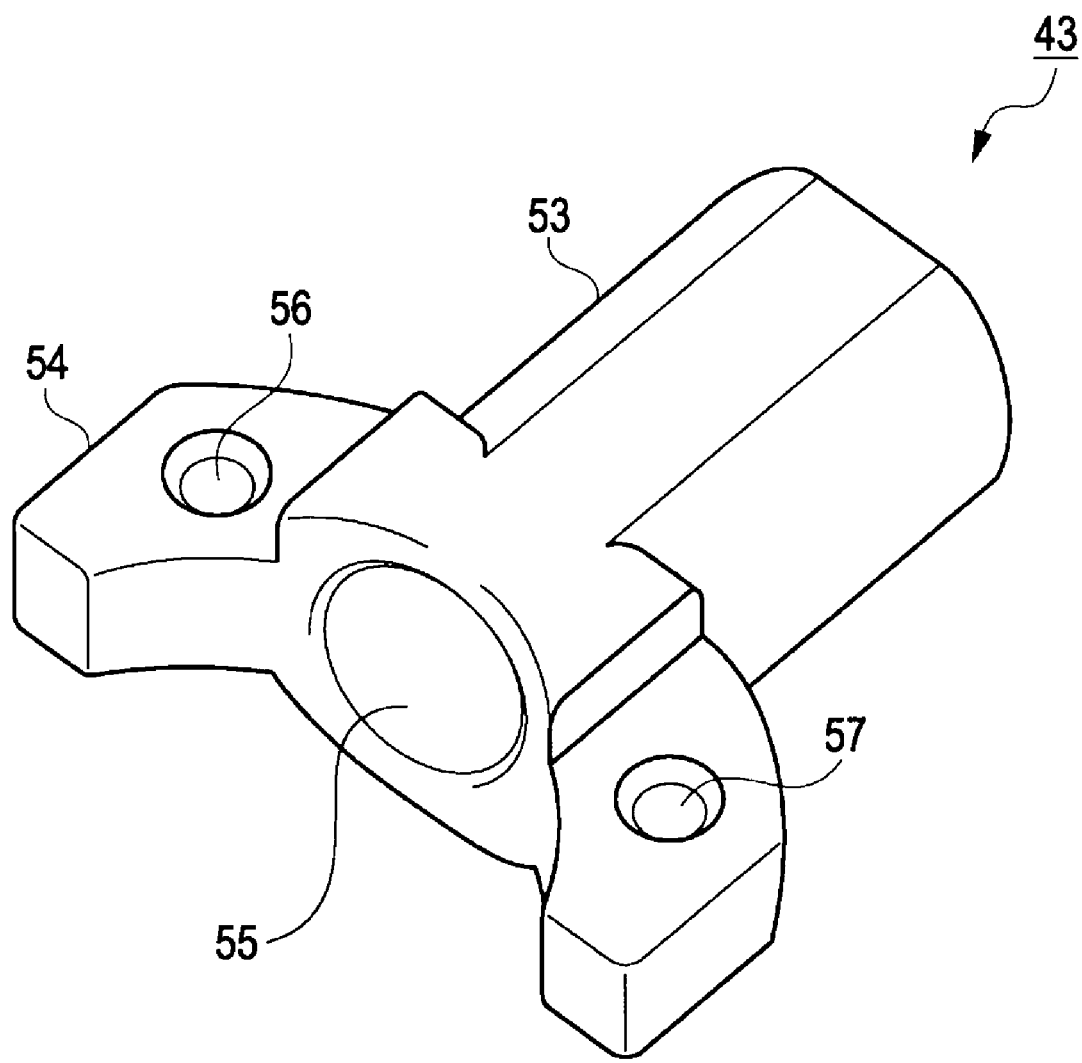
FIG. 11 is a perspective view of a hole-communicating connector which is connected to the rotating-shaft connector.

In addition, the first cylindrical member 45 also has a hole-communicating-connector hole 52 for connecting the hole-communicating connector 43 to the first cylindrical member 45 at the outer periphery thereof. The hole-communicating-connector hole 52 is formed at a position substantially opposite to the position at which the first-shaft-member insertion hole 49 is formed. As shown in FIG. 11, the hole-communicating connector 43 is formed such that a cylindrical communicating-hole portion 53 and a connecting piece 54 are connected to each other so that the overall body of the hole-communicating connector 43 has a T-shape. The hole-communicating connector 43 has the communicating hole 55 which extends through both the connecting piece 54 and the communicating-hole portion 53. In addition, a pair of pin insertion holes 56 and 57 are formed in the connecting piece 54 of the communicating connecting member 43.

The connecting piece 54 of the hole-communicating connector 43 is inserted into the hole-communicating-connector hole 52 in the rotating-shaft connector 41, and pins are inserted into pin insertion holes 59 and 60 formed in the rotating-shaft connector 41. Accordingly, as shown in FIG. 4, the pins 61 and 62 inserted into the pin insertion holes 59 and 60 are respectively inserted through the pin insertion holes 56 and 57 formed in the connecting piece 54 of the hole-communicating connector 43. Thus, the hole-communicating connector 43 is fixed to the rotating-shaft connector 41.

Figure 12:
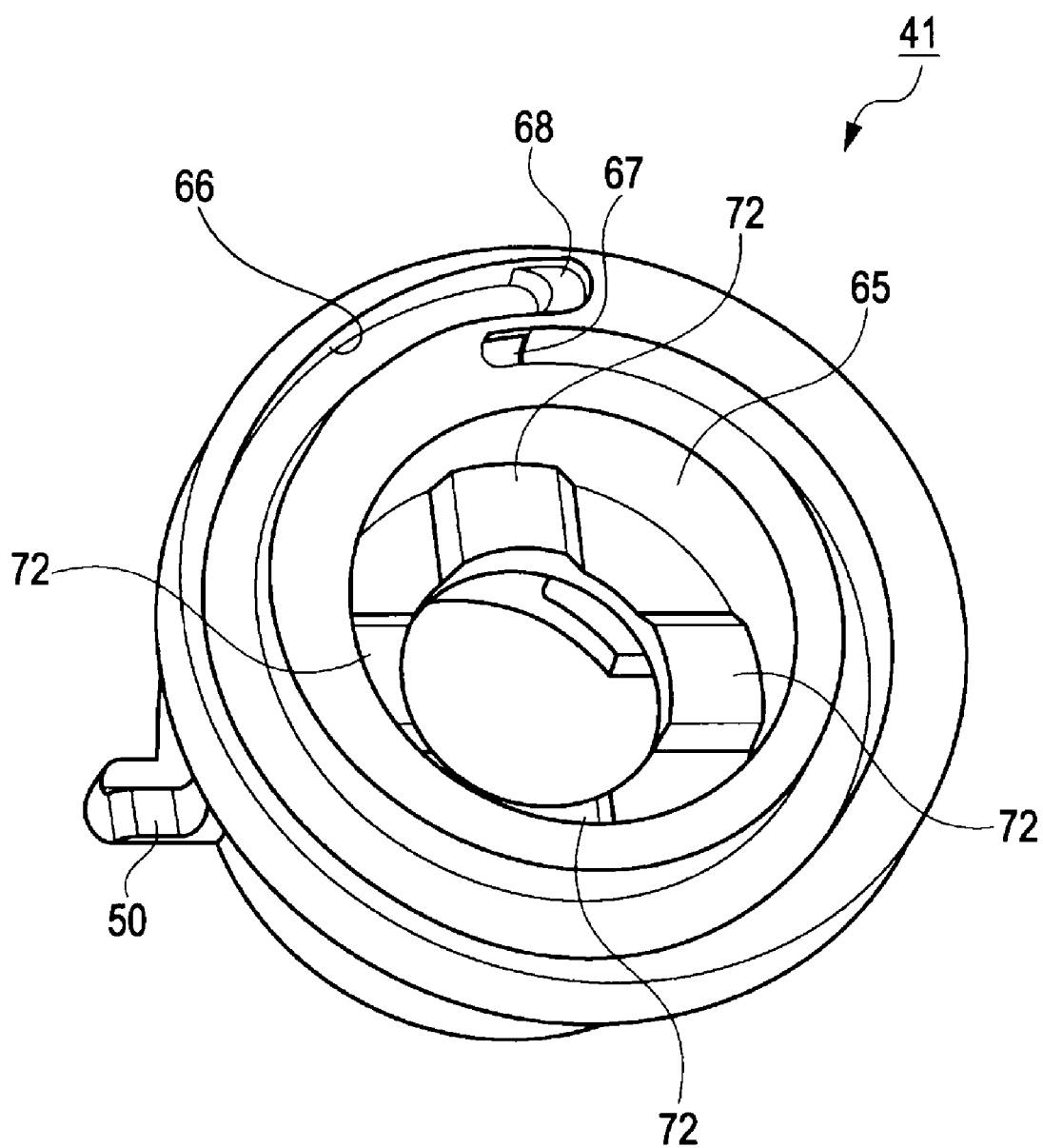
FIG. 12 is a perspective view of the rotating-shaft connector viewed from the bottom.

FIG. 12 is a perspective view of the rotating-shaft connector 41 viewed from the bottom. As shown in FIG. 12, a hole 65 for receiving the second shaft member 42, a cam member 63, and a spring 64, which are shown in FIG. 4, is formed in the bottom surface of the rotating-shaft connector 41. In addition, a groove 66 is formed in the bottom surface of the rotating-shaft connector 41 in a spiral shape such that the grove 66 surrounds the hole 65. The groove 66 extends around the hole 65 approximately one turn, and wall-shaped stoppers 67 and 68 are provided at the ends of the groove 66.

Figure 13:
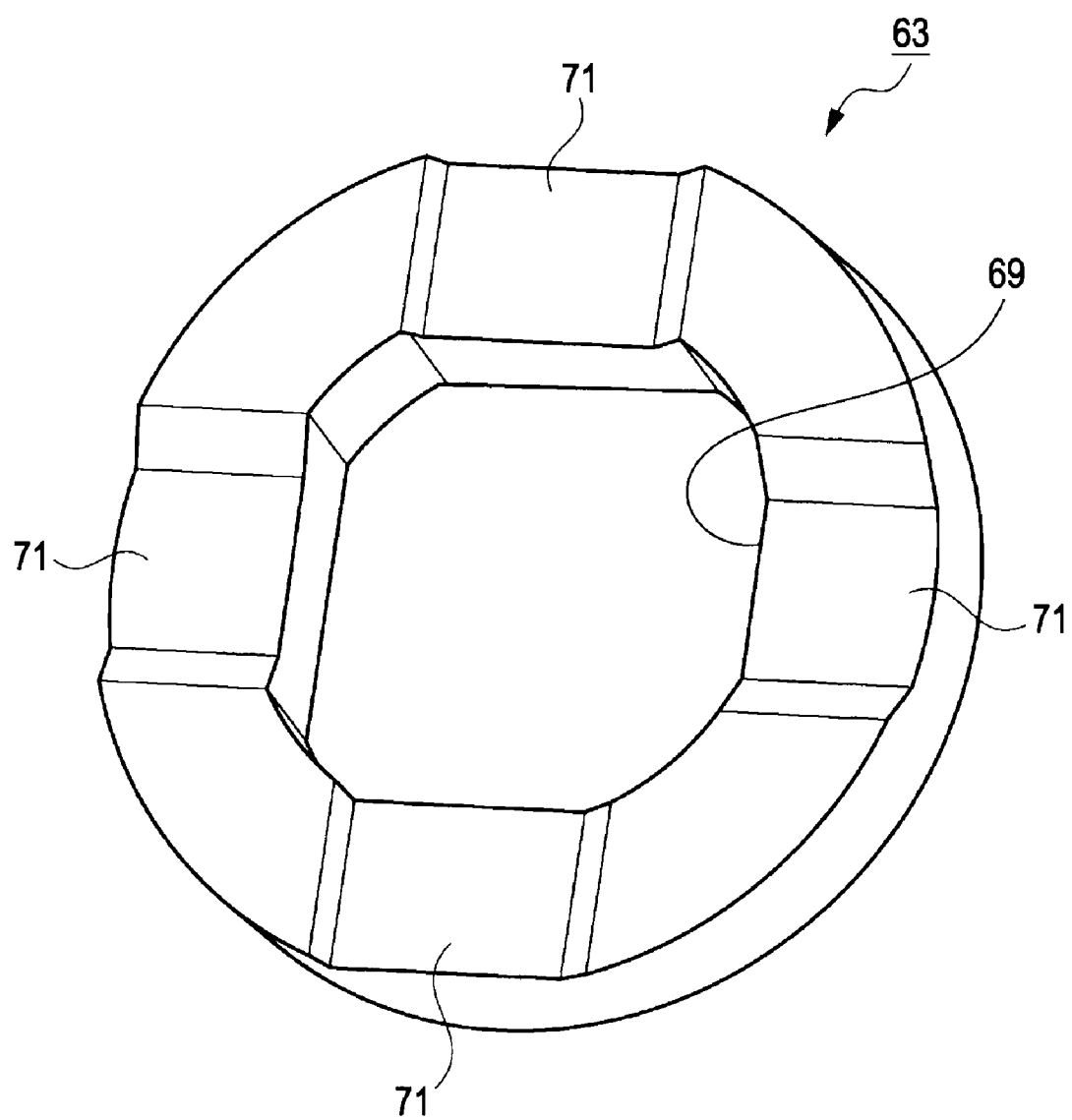
FIG. 13 is a perspective view of a cam member provided on the rotating-shaft connector.
Figure 14:
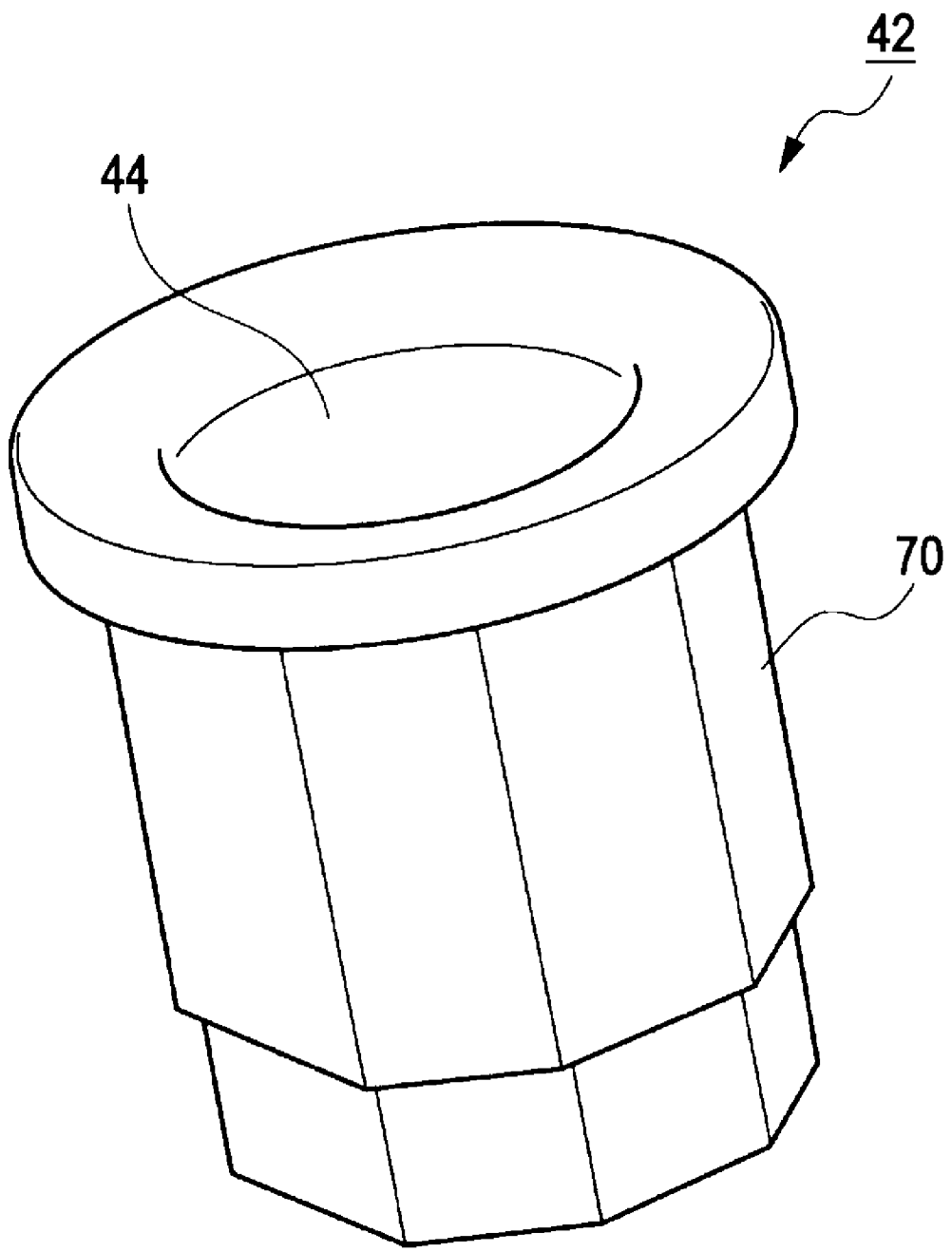
FIG. 14 is a perspective view of the second shaft member inserted in the rotating-shaft connector.

Referring to FIG. 13, the cam member 63 inserted in the hole 65 in the rotating-shaft connector 41 has a ring-like cylindrical shape with a diameter that is slightly smaller than the diameter of the hole 65. The cam member 63 has a hole 69 that is cut in a polygonal shape. FIG. 14 is a perspective view of the second shaft member 42. A peripheral portion 70 of the second shaft member 42 is cut into a shape corresponding to the polygonal shape of the hole 69 in the cam member 63. Therefore, when the second shaft member 42 is inserted into the hole 69 in the cam member 63, the cam member 63 is fixed to the second shaft member 42.

In addition, as shown in FIG. 13, the cam member 63 has four recesses 71 that are arranged in a cross shape. The recesses 71 in the cam member 63 are capable of engaging with four projections 72 provided on the rotating-shaft connector 41 shown in FIG. 12.

Figure 10:
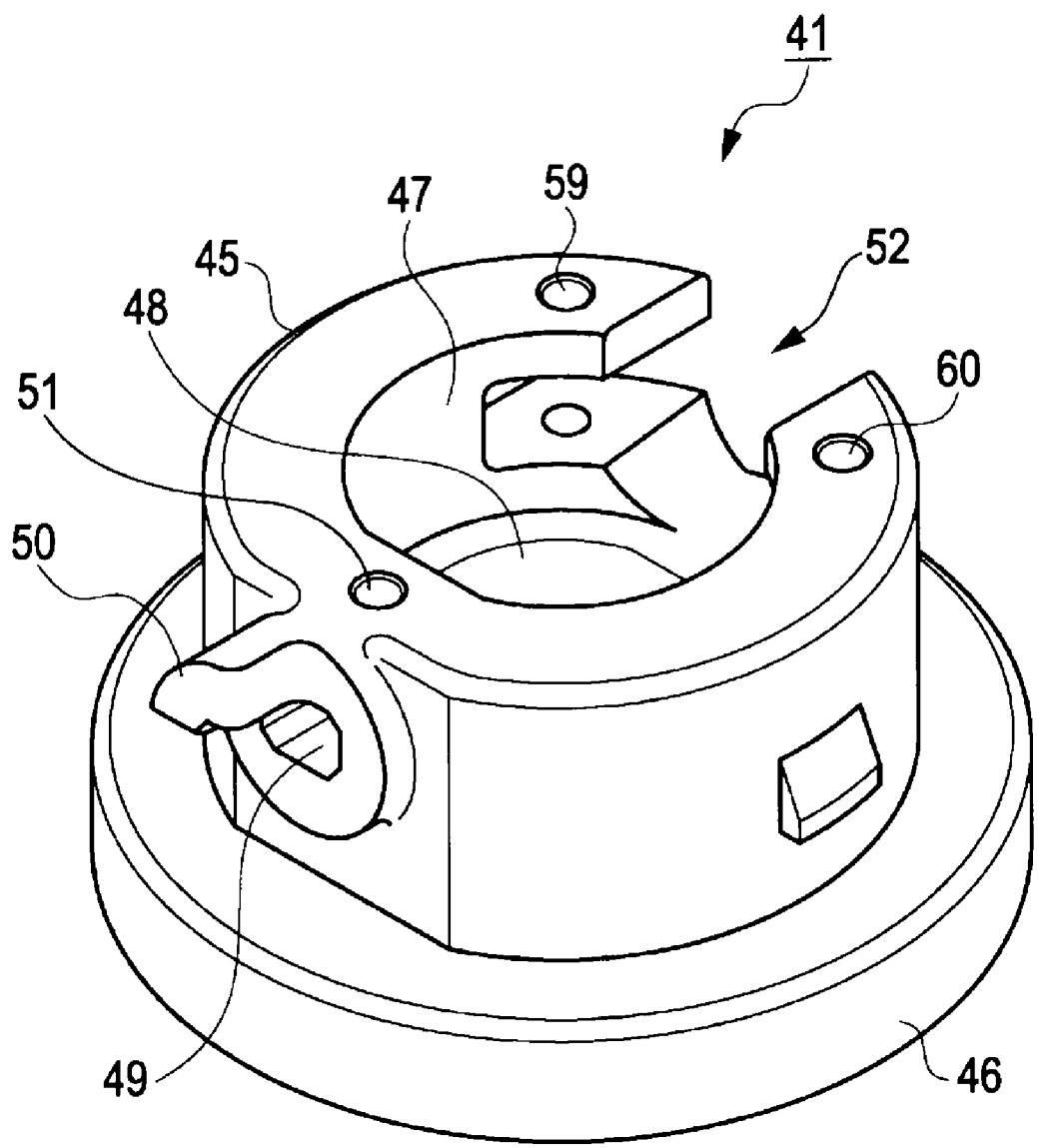
FIG. 10 is a perspective view of a rotating-shaft connector for connecting the first and second shaft members of the two-axis hinge unit to each other.

In the process of connecting the second-rotation-axis defining unit 5 to the housing, first, the second shaft member 42 shown in FIG. 14 is inserted into the hole 48 in the second cylindrical member 46 through the hole 47 in the first cylindrical member 45 from above the rotating-shaft connector 41 shown in FIG. 10. Then, in this state, the cam member 63 shown in FIG. 13 is inserted into the hole 65 formed in the bottom surface of the rotating-shaft connector 41 shown in FIG. 12. Thus, the second shaft member 42 provided on the rotating-shaft connector 41 is inserted through the hole 69 in the cam member 63 and the recesses 71 in the cam member 63 engage with the projections 72 on the rotating-shaft connector 41.

Figure 15:
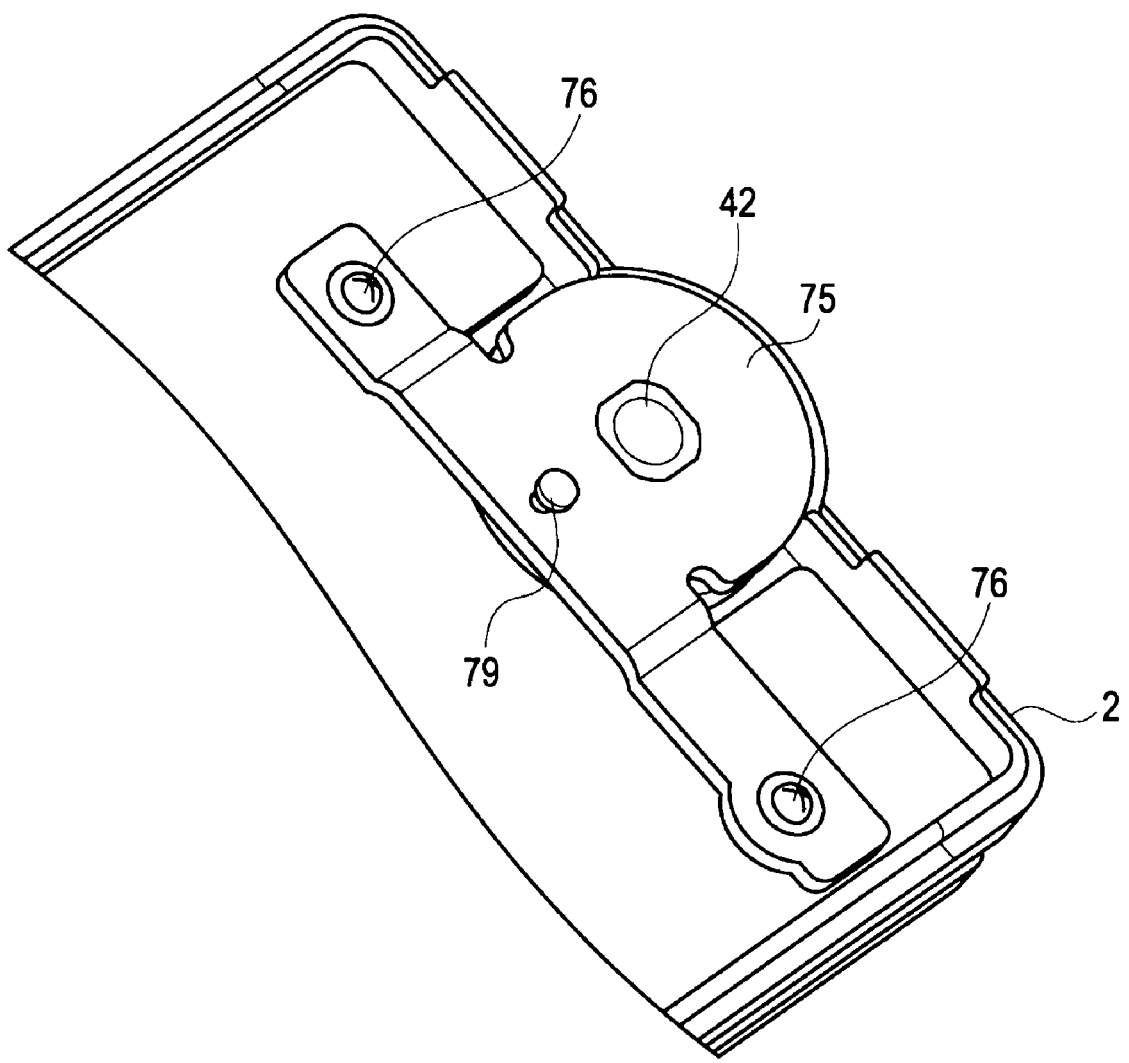
FIG. 15 is a perspective view illustrating the state in which the two-axis hinge unit is fixed to a lower housing with a fixing plate.

In this state, the spring 64 shown in FIG. 4 is inserted into the hole 65 in the rotating-shaft connector 41, and a fixing plate 75 shown in FIG. 15 is placed on the spring 64 and is fixed to the lower housing 2 with screws 76. Thus, the second-rotation-axis defining unit 5 is fixed and connected to the lower housing 2.

Structure for Absorbing Eccentricity of Spiral Groove

Figure 16:
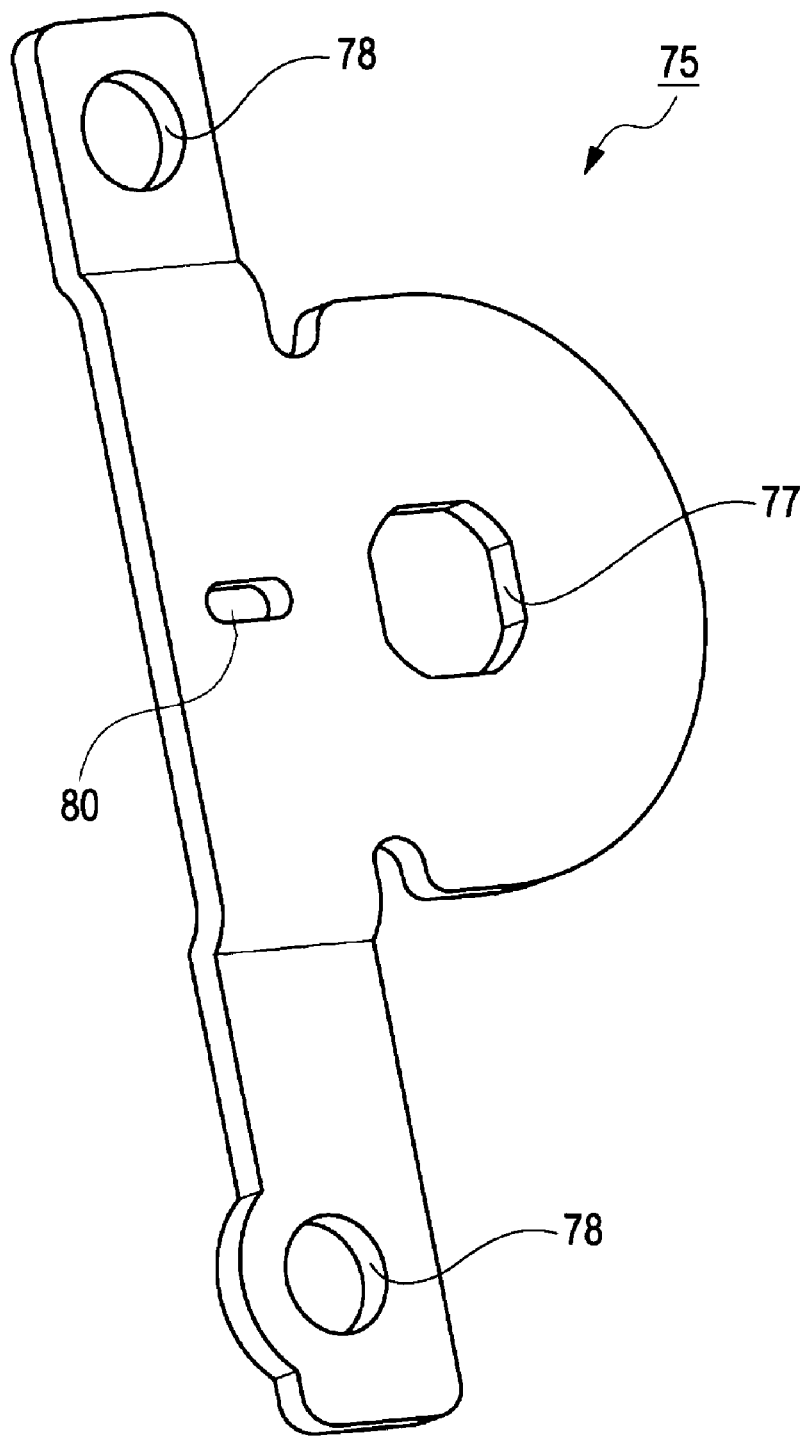
FIG. 16 is a perspective view of the fixing plate.

Referring to FIG. 16, the fixing plate 75 has a shaft-member hole 77 in which the second shaft member 42 is inserted and a pair of screw holes 78 used for fixing the fixing plate 75 to the lower housing 2 with the screws. In addition, the fixing plate 75 also has a sliding-pin hole 80 in which a sliding pin (denoted by 79 in FIG. 15) is inserted. The sliding pin 79 slides along the spiral groove 66 formed in the bottom surface of the rotating-shaft connector 41.

Figure 17:
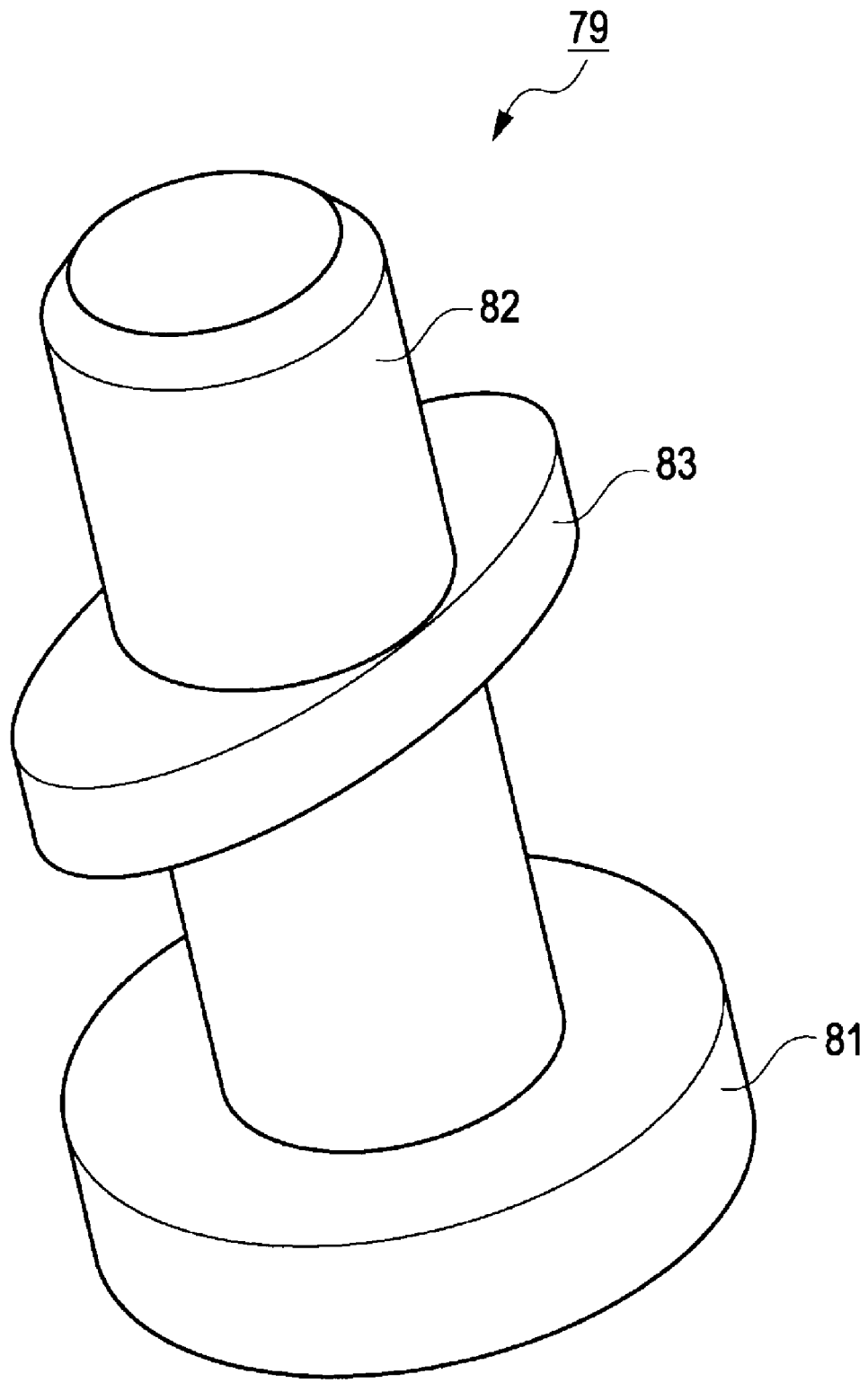
FIG. 17 is a perspective view of a sliding pin which slides along a spiral groove formed in a bottom surface of the rotating-shaft connector.
Figure 18:
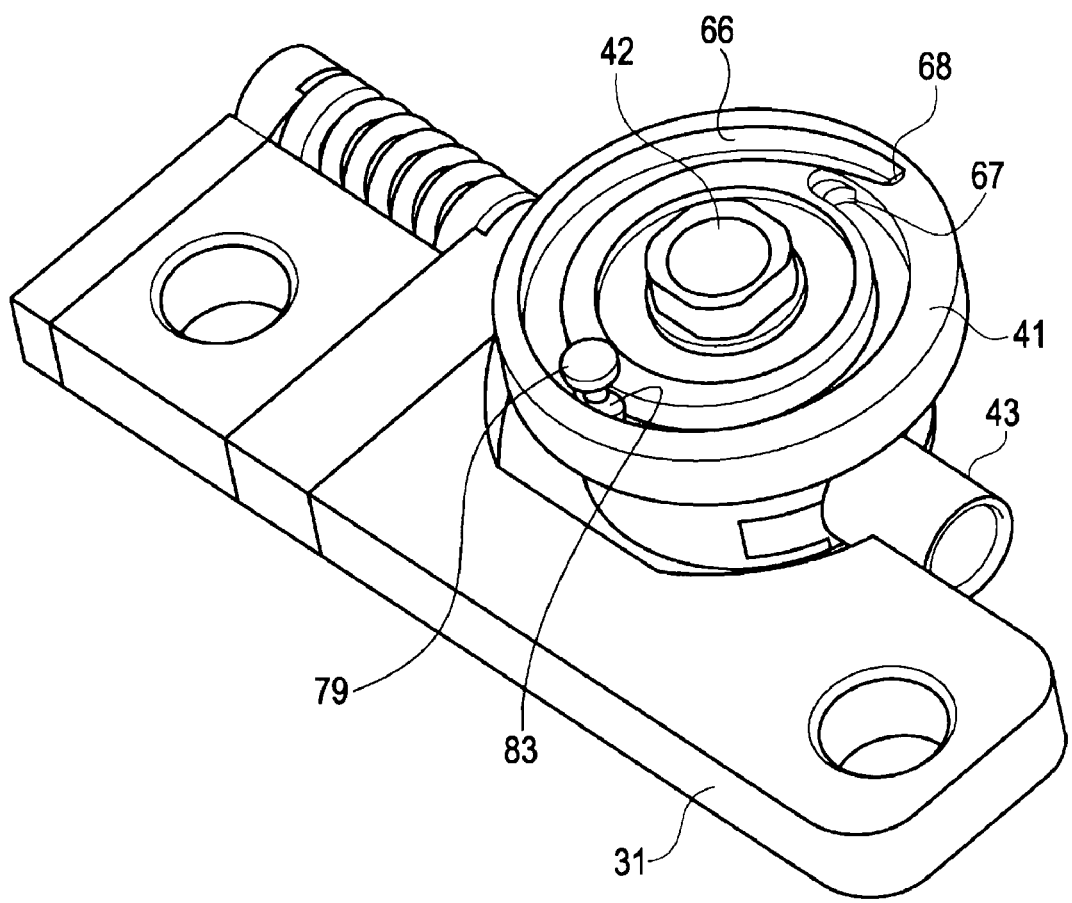
FIG. 18 is a perspective view showing the position of the sliding pin in the spiral groove in the state in which the mobile phone is closed.

As shown in FIG. 17, the sliding pin 79 has a bolt shape and includes a substantially circular plate-shaped member 81 and a columnar member 82 which is coaxially connected to the circular plate-shaped member 81 at one flat surface thereof. An elliptical plate-shaped member 83 is formed on the columnar member 82 at an intermediate position thereof in the longitudinal direction. In the state in which the sliding pin 79 is disposed so as to extend into the rotating-shaft connector 41 through the fixing plate 75 as shown in FIG. 15, the elliptical plate-shaped member 83 on the sliding pin 79 slides along the spiral groove 66 in the rotating-shaft connector 41, as shown in FIG. 18.

Figure 19:
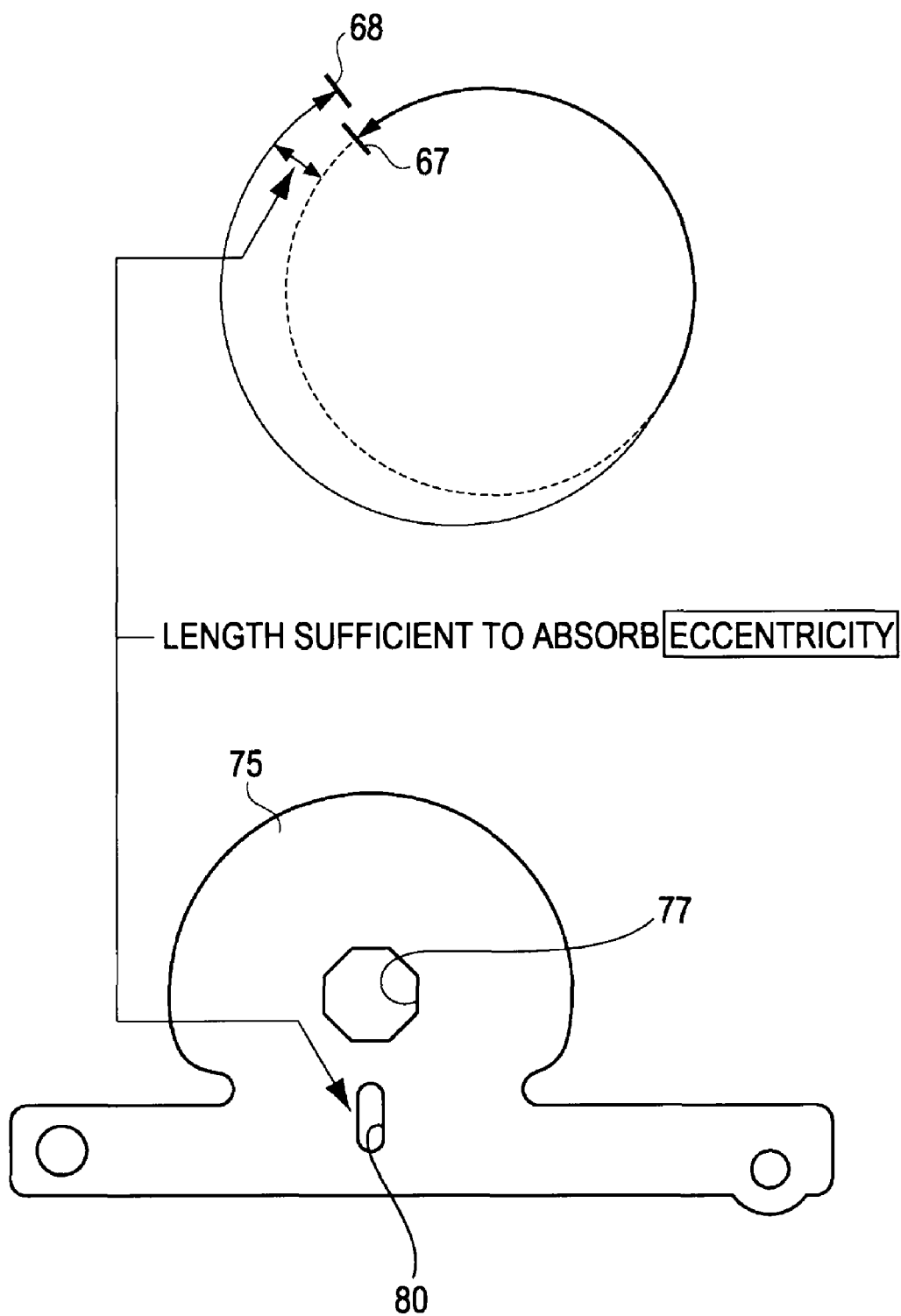
FIG. 19 is a diagram illustrating the relationship between the eccentricity of the spiral groove in the bottom surface of the rotating-shaft connector and a sliding-pin hole formed in the fixing plate.

Since the groove 66 in the rotating-shaft connector 41 has a spiral shape, the groove 66 is eccentric, as shown in FIG. 19. Therefore, when the elliptical plate-shaped member 83 on the sliding pin 79 is caused to slide along the spiral groove 66, it is necessary to move the position of the sliding pin 79 in accordance with the eccentricity of the spiral groove 66. Accordingly, the sliding-pin hole 80 formed in the fixing plate 75 has a length that is large enough to absorb the displacement of the sliding pin 79 caused when the sliding pin 79 slides along the spiral groove 66 (i.e., enough to absorb the above-described eccentricity). Thus, the housings 1 and 2 can also be smoothly rotated relative to each other around the second rotation axis defined by the second-rotation-axis defining unit 5.

Structure for Arranging Wires Through Holes

In the two-axis hinge unit 3, as shown in FIG. 2, the hole 55 formed in the hole-communicating connector 43 provided on the rotating-shaft connector 41 communicates with the hole in the second shaft member 42 provided on the rotating-shaft connector 41.

Figure 20:
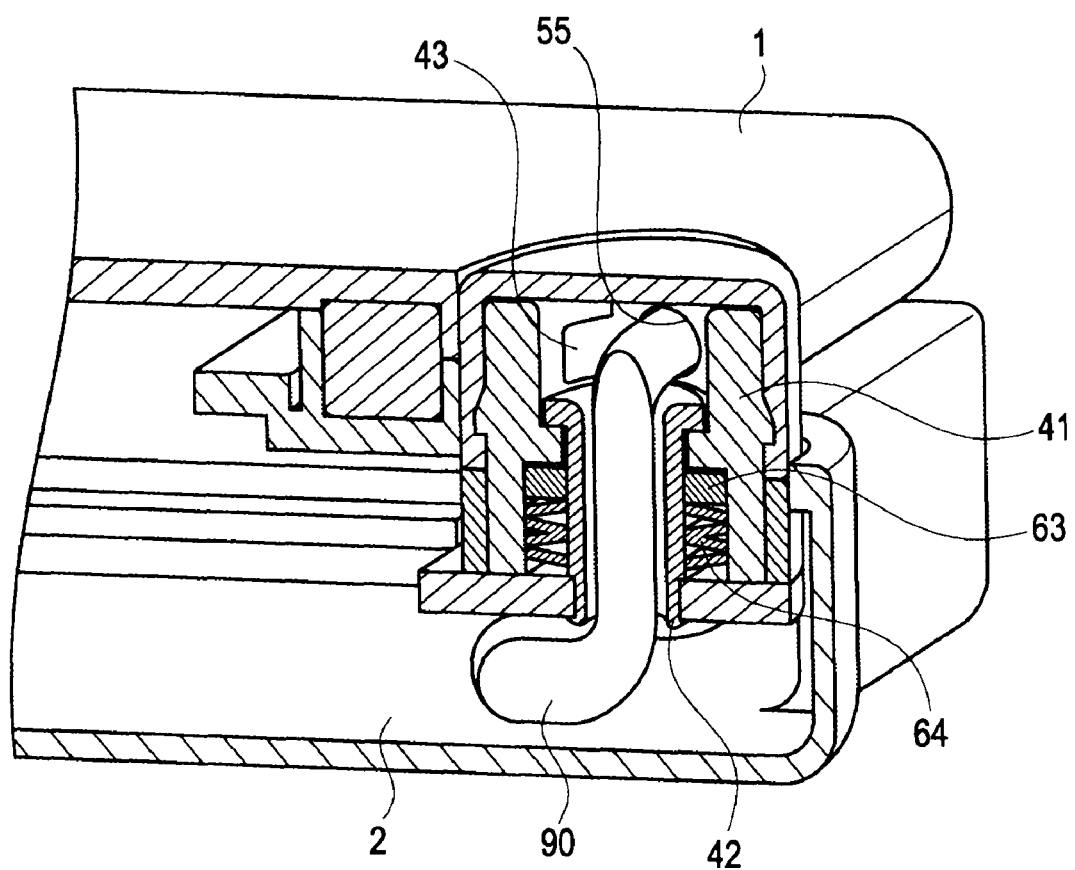
FIG. 20 is a sectional view of the two-axis hinge unit, illustrating the state in which a harness is disposed in the two-axis hinge unit.

FIG. 20 is a sectional view of the two-axis hinge unit 3 taken along the longitudinal direction of the mobile phone. As is clear from FIG. 20, in the mobile phone, a harness 90 (or a flexible board) is disposed so as to extend through the hole in the second shaft member 42 provided on the rotating-shaft connector 41 and the hole 55 in the hole-communicating connector 43 provided on the rotating-shaft connector 41. In this manner, the electrical components, such as the display unit, provided in the upper housing 1 are connected to the electrical components, such as the control unit and the operating unit, provided in the lower housing 2. Thus, the space for accommodating an electrical connecting member, such as a harness or a flexible board, can be eliminated from the two-axis hinge unit 3 and the size of the two-axis hinge unit 3 can be reduced.

Operation of Opening and Closing Mobile Phone

An operation of opening and closing the mobile phone according to the present embodiment including the above-described two-axis hinge unit 3 will now be described.

Opening and Closing Around First Rotation Axis

The operation of the two-axis hinge unit 3 in the process of opening the mobile phone in the closed state, in which the upper housing 1 and the lower housing 2 are stacked on top of each other, to the vertically opened state shown in FIG. 1 will be described. In this case, a user may, for example, hold the upper housing 1 with the right hand and the lower housing 2 with the left hand, and apply a force to the upper housing 1 by pushing the upper housing 1 upward with the right hand.

As described above with reference to FIG. 2, the arm portion 21 of the first rotating arm 7 provided on the first shaft member 6 and the arm portion 27 of the second rotating arm 10 provided on the first shaft member 6 are placed between the fixing plate 31 and the upper housing 1. Therefore, when the force is applied as described above, the housings 1 and 2 are rotated relative to each other around the first rotation axis (along the circumferential direction of the first shaft member 6) and the mobile phone is set to the vertically opened state shown in FIG. 1.

When the mobile phone is in the closed state, the projection 18 on the first rotating arm 7 shown in FIG. 5 is in contact with the stopper 50 on the rotating-shaft connector 41 shown in FIG. 10. When the user vertically opens the mobile phone and the housings 1 and 2 are rotated relative to each other, the projection 18 on the first rotating arm 7 is temporarily separated from the stopper 50 on the rotating-shaft connector 41. Then, when the opening angle between the housings 1 and 2 reaches, for example, about 165 degrees, the projection 18 on the first rotating arm 7 comes into contact with the stopper 50 on the rotating-shaft connector 41 again. Thus, the opening angle between the housings 1 and 2 is restricted to about 165 degrees and the mobile phone is prevented from breaking when the user applies a large force to open the mobile phone.

Figure 8:
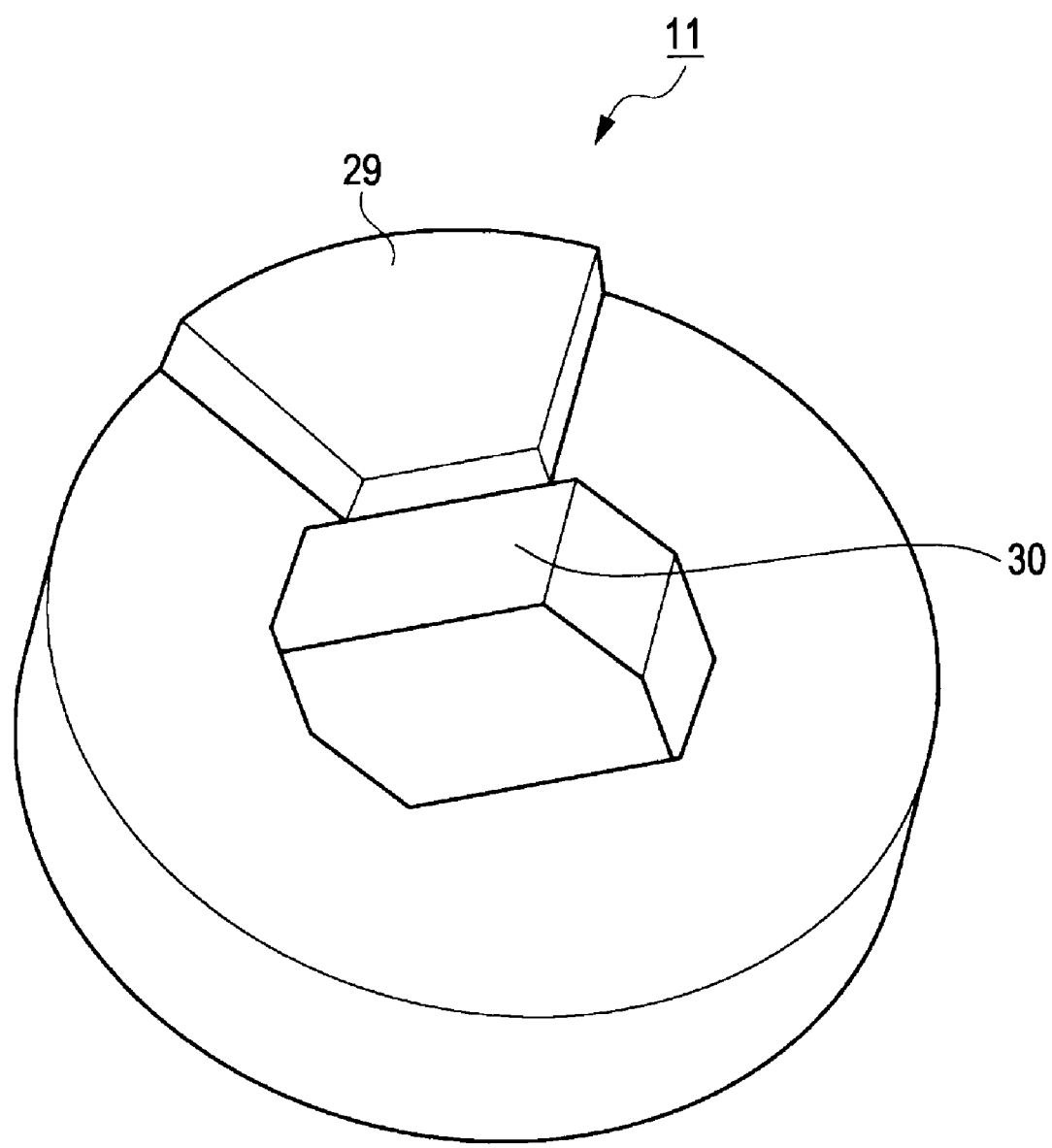
FIG. 8 is a perspective view of a cam member fitted to the second rotating arm.

In addition, when the mobile phone is in the closed state, the projection 29 on the cam member 11 shown in FIG. 8 is engaged with the recess 28a in the second rotating arm 10 shown in FIG. 7. When the user vertically opens the mobile phone and the housings 1 and 2 are rotated relative to each other, the projection 29 on the cam member 11 is released from the recess 28a in the second rotating arm 10. Then, when the opening angle between the housings 1 and 2 reaches, for example, about 165 degrees, the projection 29 on the cam member 11 engages with the recess 28b in the second rotating arm 10.

As described above, the second rotating arm 10 is urged against the cam member 11 by the spring 9. Therefore, when the opening angle between the housings 1 and 2 reaches, for example, about 165 degrees and the projection 29 on the cam member 11 engages with the recess 28b in the second rotating arm 10, a clicking sound is generated. The user hears the clicking sound and recognizes that the mobile phone is set to the vertically opened state.

When the mobile phone in the vertically opened state is closed by rotating the housings 1 and 2 relative to each other, the projection 29 on the cam member 11, which is engaged with the recess 28b in the second rotating arm 10 in the vertically opened state, is released from the recess 28b in the second rotating arm 10. Then, when the mobile phone is set to the closed state, the projection 29 on the cam member 11 engages with the recess 28a in the second rotating arm 10. Also in this case, the clicking sound is generated and the user recognizes that the mobile phone is closed when the user hears the clicking sound.

Opening and Closing Around Second Rotation Axis

Figure 21:
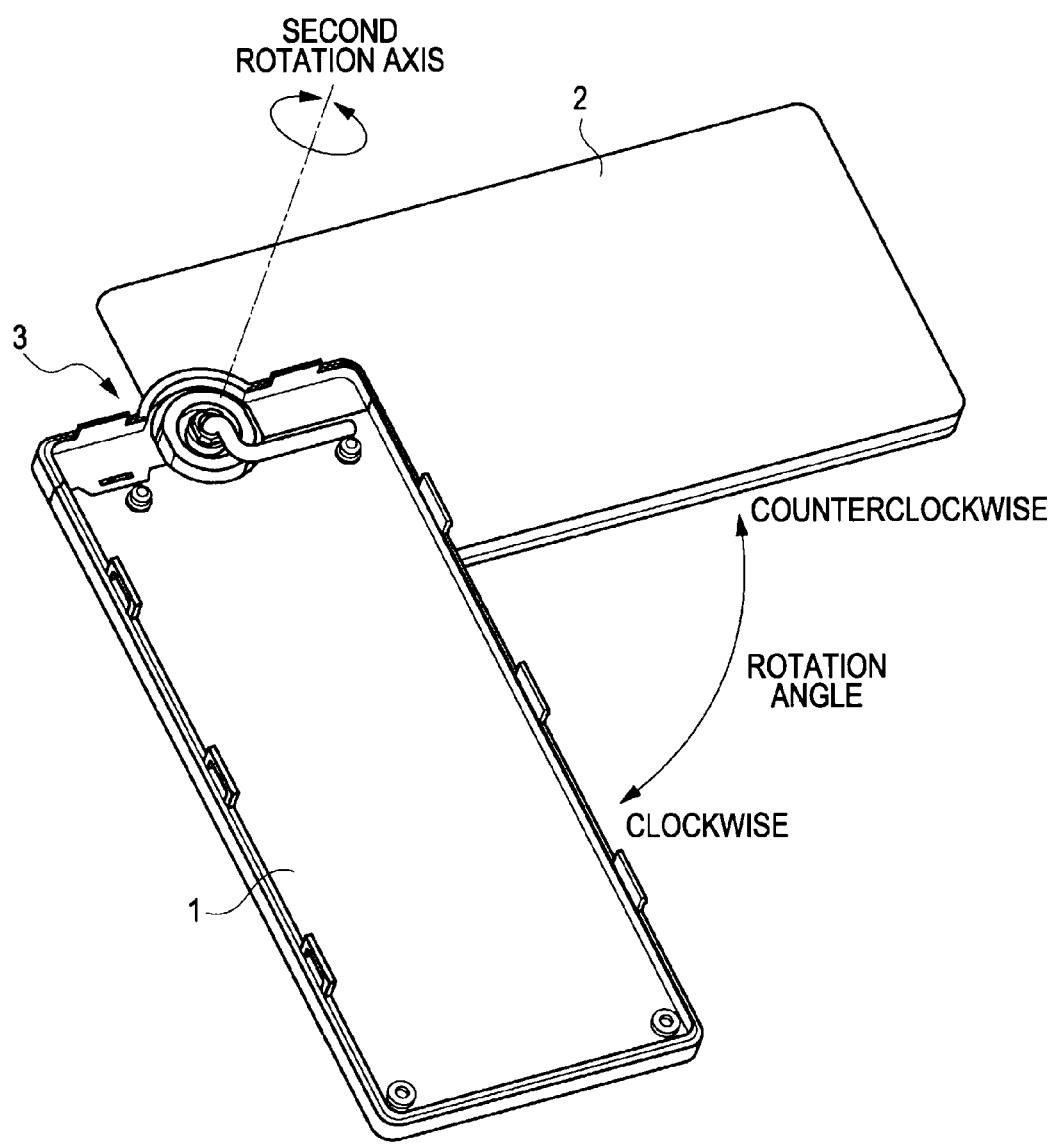
FIG. 21 is a perspective view illustrating a rotating operation of the two-axis hinge unit around a second rotation axis.

If a clockwise or counterclockwise force is applied to the upper housing 1 while the mobile phone is in the closed state in which the upper housing 1 and the lower housing 2 are stacked on top of each other, the clockwise or counterclockwise force is transmitted to the first shaft member 6 through the arm portion 21 of the first rotating arm 7 and the arm portion 27 of the second rotating arm 10, which are fixed to the upper housing 1 as shown in FIG. 2. Thus, the rotating-shaft connector 41 is rotated clockwise or counterclockwise with the first shaft member 6 serving as the power point. Accordingly, as shown in FIG. 21, the upper housing 1 rotates clockwise or counterclockwise with the second shaft member 42 serving as the rotating shaft.

When the mobile phone is in the closed state, the sliding pin 79 is positioned approximately at the midpoint of the spiral groove 66 formed in the bottom surface of the rotating-shaft connector 41, as shown in FIG. 18. If the user rotates the upper housing 1 clockwise from this state, the sliding pin 79 comes into contact with the stopper 67 at one end of the spiral groove 66 when the rotation angle between the upper housing 1 and the lower housing 2 reaches, for example, about 180 degrees, in other words, when the upper housing 1 and the lower housing 2 are set to the vertically opened state shown in FIG. 1. Thus, the rotation angle of the clockwise rotation is restricted to about 180 degrees.

Similarly, if the user rotates the upper housing 1 counterclockwise from the state in which the mobile phone is closed, the sliding pin 79 comes into contact with the stopper 68 at the other end of the spiral groove 66 when the rotation angle between the upper housing 1 and the lower housing 2 reaches, for example, about 180 degrees, in other words, when the upper housing 1 and the lower housing 2 are set to the vertically opened state shown in FIG. 1. Thus, the rotation angle of the counterclockwise rotation is also restricted to about 180 degrees.

The sliding-pin hole 80 formed in the fixing plate 75 with which the sliding pin 79 is fixed has a length that is large enough to absorb the displacement of the sliding pin 79 caused when the sliding pin 79 slides along the groove 66. Therefore, as described above, when the upper housing 1 is rotated clockwise or counterclockwise, the sliding pin 79 smoothly slides along the groove 66 and the upper housing 1 can be smoothly rotated.

In the mobile phone according to the present embodiment, the housings 1 and 2 can be rotated relative to each other around the second rotation axis. The user can stop the rotation around the second rotation axis at a desired rotation angle and watch, for example, television, characters or images (still images or moving images) displayed on the display unit, or the like.

In the above description, the upper housing 1 is rotated clockwise or counterclockwise from the state in which the mobile phone is closed and the upper housing 1 and the lower housing 2 are stacked on top of each other. However, the mobile phone can also be closed by rotating the upper housing 1 clockwise or counterclockwise from the state in which the mobile phone is vertically opened as shown in FIG. 1.

Figure 22:
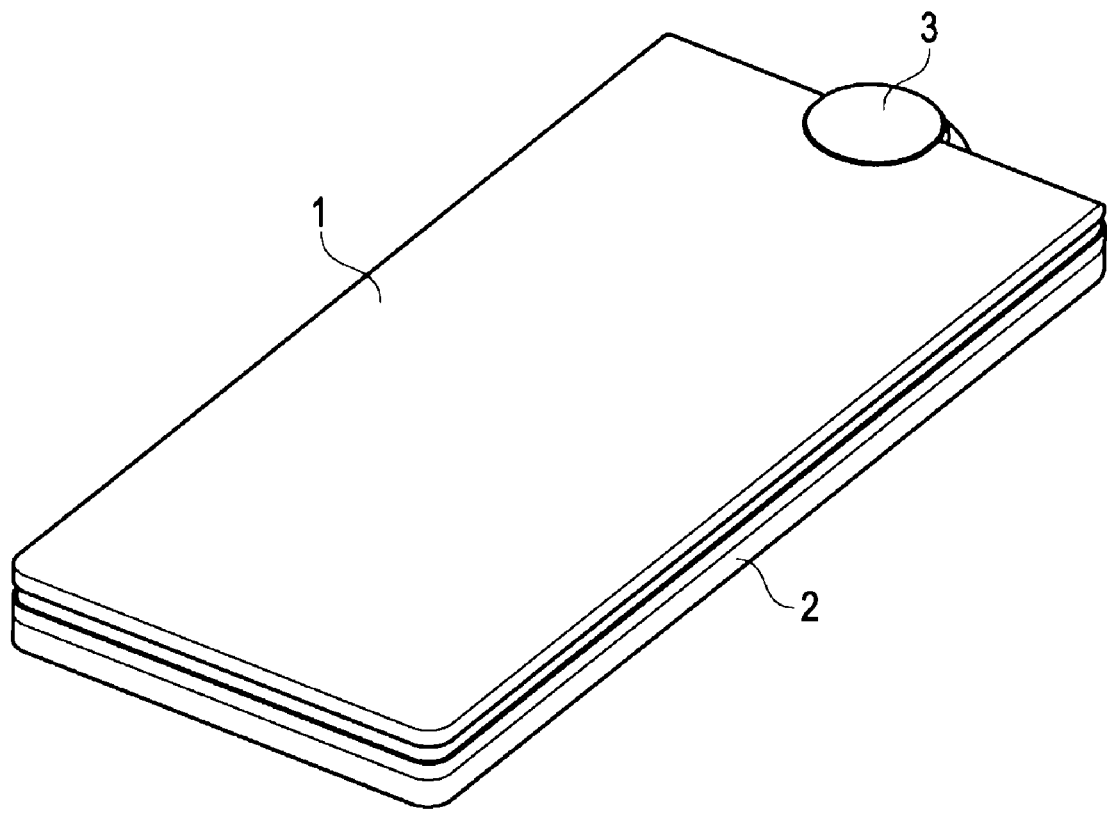
FIG. 22 is a perspective view of the mobile phone according to the embodiment in the closed state.

In general, the closed state of the mobile phone is a state in which the display unit provided in the upper housing 1 and the operating unit provided in the lower housing 2 face each other, as shown in FIG. 22. However, according the mobile phone of the present embodiment, the mobile phone can also be closed such that the display unit provided in the upper housing 1 and the operating unit provided in the lower housing 2 face the same direction.

In this case, first, the mobile phone is vertically opened from the closed state in which the display unit provided in the upper housing 1 and the operating unit provided in the lower housing 2 face each other, so that the mobile phone is set to the vertically opened state shown in FIG. 1.

Figure 23:
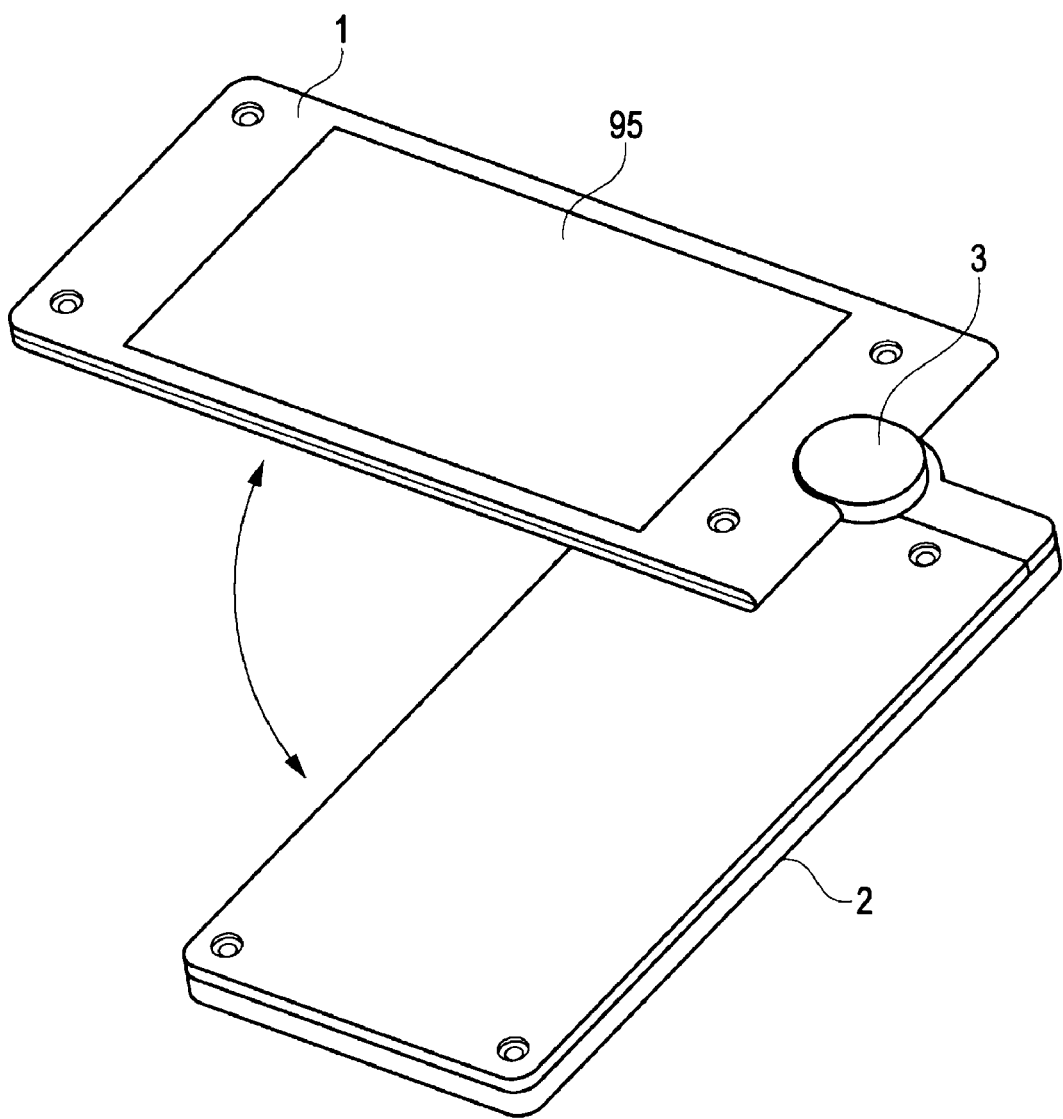
FIG. 23 is a perspective view illustrating a rotating operation around the second rotation axis performed from the state in which the mobile phone according to the embodiment is vertically opened.
Figure 24:
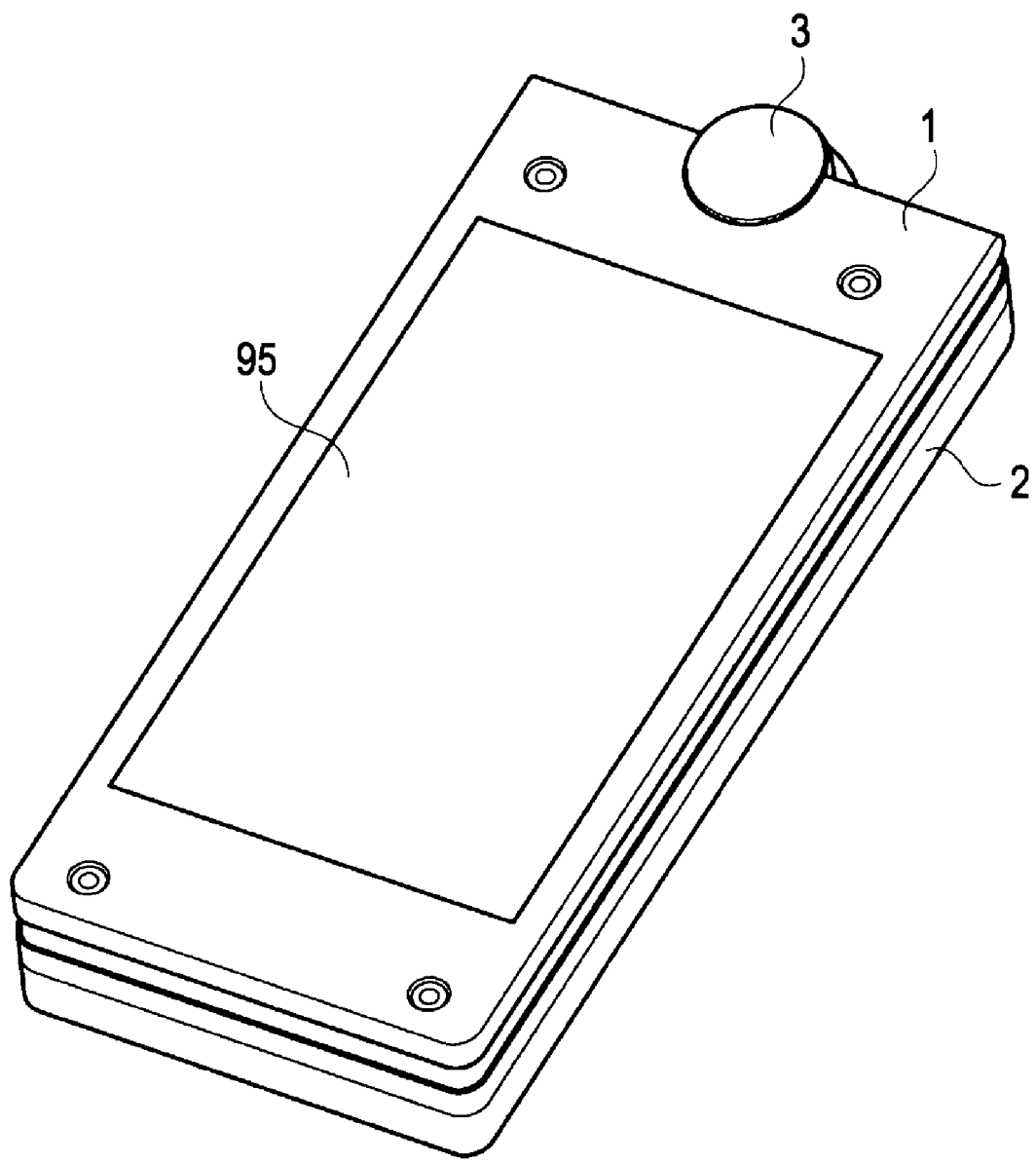
FIG. 24 is a perspective view of the mobile phone of the embodiment in a closed state in which a display unit faces outward, which is obtained as a result of the rotating operation around the second rotation axis from the vertically opened state.

Then, the upper housing 1 is rotated clockwise or counterclockwise from the state in which the mobile phone is vertically opened. Accordingly, the upper housing 1 is rotated around the second rotation axis as shown in FIG. 23, and the mobile phone is closed such that a display unit 95 faces outward, as shown in FIG. 24. In other words, the mobile phone is closed such that the display unit 95 and the operating unit provided in the lower housing 2 face the same direction.

Accordingly, the user can watch, for example, television, characters or images (still images or moving images) displayed on the display unit, etc., while the display unit 95 faces outward and the mobile phone is closed and folded into a compact size.

Advantages of the Embodiment

As is clear from the above description, in the mobile phone according to the present embodiment, the harness 90 (or a flexible board) is disposed so as to extend through the hole in the second shaft member 42 provided on the rotating-shaft connector 41 of the two-axis hinge unit 3 and the hole 55 in the hole-communicating connector 43 provided on the rotating-shaft connector 41. In this manner, the electrical components, such as the display unit, provided in the upper housing 1 are connected to the electrical components, such as the control unit and the operating unit, provided in the lower housing 2. Thus, the space for accommodating the electrical connecting member, such as a harness or a flexible board, can be eliminated from the two-axis hinge unit 3 and the size of the two-axis hinge unit 3 can be reduced.

In addition, since the size of the two-axis hinge unit 3 can be reduced, the occurrence of electric wave disturbances which occur due to the hinge unit if the hinge unit largely projects from the housing can be prevented.

Modifications

According to the above-described embodiment, the present invention is applied to a mobile phone. However, the present invention may also be applied to other types of apparatuses, such as a personal handyphone system (PHS), a personal digital assistant (PDA), a portable game device, a digital camera, and a notebook personal computer. In either case, the above-described advantages can be obtained.

The present application contains subject matter related to that disclosed in Japanese Priority Patent Application JP 2008-113329 filed in the Japan Patent Office on Apr. 24, 2008, the entire content of which is hereby incorporated by reference.

The above-described embodiment is an example of a structure according to the present invention. Therefore, the present invention is not limited to the above-described embodiment. It should be understood by those skilled in the art that various modifications, combinations, sub-combinations and alterations may occur depending on design requirements and other factors insofar as they are within the scope of the appended claims or the equivalents thereof.

What is claimed is:

1. A two-axis hinge device, comprising:
a first-rotation-axis defining unit which defines a first rotation axis;
a rotating arm fixed to a first housing, the rotating arm being provided on the first-rotation-axis defining unit such that the rotating arm is rotatable around the first rotation axis;
a second-rotation-axis defining unit fixed to a second housing, the second-rotation-axis defining unit having a substantially cylindrical shape and defining a second rotation axis which is substantially perpendicular to the first rotation axis, the first-rotation-axis defining unit being fixed to and supported by the second-rotation-axis defining unit; and
a hole-communicating connector fixed to the second-rotation-axis defining unit, the hole-communicating connector having a substantially cylindrical shape and being provided with a hole which communicates with a hole in the second-rotation-axis defining unit,
wherein the second-rotation-axis defining unit includes
a spiral groove provided in a bottom surface of the second-rotation-axis defining unit, the spiral groove including stoppers at either end thereof,
a fixing member configured to fix the second-rotation-axis defining unit to the second housing,
a sliding pin configured to slide along the spiral groove when the second housing is rotated around the second rotation axis defined by the second-rotation-axis defining unit, and
a sliding-pin supporting hole provided in the fixing member, the sliding-pin supporting hole supporting the sliding pin while the sliding pin is inserted in the spiral groove and having a length that is large enough to allow the sliding pin to move along the spiral groove between the stoppers at either end of the spiral groove in accordance with the eccentricity of the spiral groove when the second housing is rotated around the second rotation axis.

2. The two-axis hinge device according to claim 1, wherein the hole-communicating connector is fixed to the second-rotation-axis defining unit such that the hole in the second-rotation-axis defining unit is continuously connected to the hole in the hole-communicating connector in a direction substantially opposite to a direction in which the first-rotation-axis defining unit fixed to and supported by the second-rotation-axis defining unit extends.

3. A mobile terminal apparatus, comprising:
a first housing which houses a predetermined electrical component;
a second housing which houses a predetermined electrical component;
a two-axis hinge unit including
a first-rotation-axis defining unit which defines a first rotation axis,
a rotating arm fixed to the first housing, the rotating arm being provided on the first-rotation-axis defining unit such that the rotating arm is rotatable around the first rotation axis,
a second-rotation-axis defining unit fixed to the second housing, the second-rotation-axis defining unit having a substantially cylindrical shape and defining a second rotation axis which is substantially perpendicular to the first rotation axis, the first-rotation-axis defining unit being fixed to and supported by the second-rotation-axis defining unit, and
a hole-communicating connector fixed to the second-rotation-axis defining unit, the hole-communicating connector having a substantially cylindrical shape and being provided with a hole which communicates with a hole in the second-rotation-axis defining unit; and
an electrical connecting member which extends through the hole in the second-rotation-axis defining unit and the hole in the hole-communicating connector, the electrical connecting member connecting the electrical component included in the first housing and the electrical component included in the second housing to each other,
wherein the second-rotation-axis defining unit of the two-axis hinge unit includes
a spiral groove provided in a bottom surface of the second-rotation-axis defining unit, the spiral groove including stoppers at either end thereof,
a fixing member configured to fix the second-rotation-axis defining unit to the second housing,
a sliding pin configured to slide along the spiral groove when the second housing is rotated around the second rotation axis defined by the second-rotation-axis defining unit, and
a sliding-pin supporting hole provided in the fixing member, the sliding-pin supporting hole supporting the sliding pin while the sliding pin is inserted in the spiral groove and having a length that is large enough to allow the sliding pin to move along the spiral groove between the stoppers at either end of the spiral groove in accordance with the eccentricity of the spiral groove when the second housing is rotated around the second rotation axis.

* * * * *